(12) United States Patent
Damnjanovic et al.

(10) Patent No.: US 11,297,510 B2
(45) Date of Patent: Apr. 5, 2022

(54) MEDIUM ACCESS FOR SHARED OR UNLICENSED SPECTRUM

(71) Applicant: QUALCOMM Incorporated, San Diego, CA (US)

(72) Inventors: Jelena Damnjanovic, Del Mar, CA (US); Aleksandar Damnjanovic, Del Mar, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 14/989,505

(22) Filed: Jan. 6, 2016

(65) Prior Publication Data

US 2016/0212625 A1    Jul. 21, 2016

Related U.S. Application Data

(60) Provisional application No. 62/105,033, filed on Jan. 19, 2015.

(51) Int. Cl.
*H04L 12/00* (2006.01)
*H04W 16/14* (2009.01)
(Continued)

(52) U.S. Cl.
CPC ....... *H04W 16/14* (2013.01); *H04W 72/0453* (2013.01); *H04W 72/10* (2013.01);
(Continued)

(58) Field of Classification Search
None
See application file for complete search history.

(56) References Cited

U.S. PATENT DOCUMENTS

| 5,850,596 A | 12/1998 | Reynolds |
| 2006/0089099 A1* | 4/2006 | Buchwald ............. H04W 74/00 455/41.2 |

(Continued)

FOREIGN PATENT DOCUMENTS

| CN | 103650544 A | 3/2014 |
| CN | 103916865 A | 7/2014 |

(Continued)

OTHER PUBLICATIONS

ISA/EPO, International Search Report and Written Opinion of the International Searching Authority, Int'l Appl. No. PCT/US2016/012442, dated Apr. 8, 2016, European Patent Office, Rijswijk, NL, 15 pgs.

*Primary Examiner* — Ajit Patel
*Assistant Examiner* — Lionel Preval
(74) *Attorney, Agent, or Firm* — Qualcomm Incorporated

(57) ABSTRACT

Methods, systems, and devices are described for wireless communication at a UE. A wireless devices may use a shared or unlicensed spectrum configuration based on a prioritization scheme for the shared frequency resources. The prioritization scheme may assign a priority to different operators and may enable devices associated with a prioritized operator to access the shared band over non-prioritized devices. For example, a non-prioritized device may win the channel and begin communicating over the shared or unlicensed spectrum. The non-prioritized device may then periodically cease transmission for a set interval (i.e., a preemption opportunity) and listen for an indication that a prioritized device wishes to use the channel. If a prioritized device begins transmitting (or, in some cases, if the prioritized device transmits a medium preemption indication) the non-prioritized device may relinquish control of the channel.

12 Claims, 14 Drawing Sheets

(51) Int. Cl.
*H04W 72/10* (2009.01)
*H04W 72/04* (2009.01)
*H04W 74/08* (2009.01)

(52) U.S. Cl.
CPC ... *H04W 74/0833* (2013.01); *H04W 74/0875* (2013.01); *H04W 74/0808* (2013.01)

(56) References Cited

U.S. PATENT DOCUMENTS

| | | | | |
|---|---|---|---|---|
| 2010/0091789 A1* | 4/2010 | Choi | ................ | H04W 72/0446 370/445 |
| 2013/0051358 A1* | 2/2013 | Turtinen | ........... | H04W 72/0453 370/330 |
| 2013/0070626 A1* | 3/2013 | Gaal | ..................... | H04W 48/12 370/252 |
| 2013/0195073 A1 | 8/2013 | Chen et al. | | |
| 2014/0036818 A1* | 2/2014 | Koskela | ........... | H04W 72/1231 370/329 |
| 2014/0341035 A1 | 11/2014 | Bhushan et al. | | |
| 2015/0188592 A1* | 7/2015 | Solondz | ............... | H04B 1/3888 455/501 |
| 2015/0373554 A1* | 12/2015 | Freda | .................... | H04L 5/0073 455/450 |
| 2016/0021664 A1* | 1/2016 | Chou | ................ | H04W 52/0229 370/329 |
| 2016/0345181 A1* | 11/2016 | Bendlin | ........... | H04W 72/0413 |
| 2017/0006505 A1* | 1/2017 | Liu | ........................ | H04W 28/26 |
| 2017/0142737 A1* | 5/2017 | Zheng | .................... | H04W 16/14 |
| 2017/0223738 A1* | 8/2017 | Seo | ..................... | H04W 74/085 |
| 2017/0245303 A1* | 8/2017 | Falconetti | ......... | H04W 74/0891 |
| 2017/0325253 A1* | 11/2017 | Wang | ..................... | H04L 27/04 |

FOREIGN PATENT DOCUMENTS

| | | |
|---|---|---|
| JP | 2012505589 A | 3/2012 |
| JP | 2014116898 A | 6/2014 |
| WO | WO-2011093642 A2 | 8/2011 |
| WO | WO-2013144682 A1 | 10/2013 |

\* cited by examiner

MEDIUM ACCESS FOR SHARED OR UNLICENSED SPECTRUM

CROSS REFERENCES

The present Application for Patent claims priority to U.S. Provisional Patent Application No. 62/105,033 by Damnjanovic et al., entitled "Medium Access For Enhanced Component Carriers In Shared Spectrum," filed Jan. 19, 2015, assigned to the assignee hereof, and expressly incorporated by reference herein.

BACKGROUND

Field of Disclosure

The following relates generally to wireless communication, and more specifically to medium access (e.g., for enhanced component carriers (eCCs)) in shared or unlicensed spectrum.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink (DL) channels (e.g., for transmissions from a base station to a UE) and uplink (UL) channels (e.g., for transmissions from a UE to a base station).

In some cases, shared frequency resources may be available to wireless devices associated with multiple operators. Devices associated with different operators may attempt to use the shared spectrum at the same time. This may result in collisions between transmissions from the different devices, and may disrupt prioritized transmissions.

SUMMARY

Systems, methods, and apparatuses for medium access in shared or unlicensed spectrum are described. Wireless devices may use a prioritization scheme for sharing a frequency band. The prioritization scheme may assign a priority to different operators and may enable devices associated with a prioritized operator to access the shared band over non-prioritized devices. Communication by prioritized or non-prioritized devices may use a carrier in shared or unlicensed spectrum (e.g., eCC, etc.). For example, a non-prioritized device may win the channel and begin communicating over the carrier. The non-prioritized device may then periodically cease transmission for a set interval (i.e., a preemption opportunity) and listen for an indication that a prioritized device wishes to use the channel. If a prioritized device begins transmitting (or, in some cases, if the device transmits a medium preemption indication) the non-prioritized device may relinquish control of the channel.

A method of communication at a wireless device is described. The method may include transmitting a signal on a carrier in shared or unlicensed spectrum (e.g., eCC, etc.) during a first transmission time period, identifying a medium preemption opportunity for the carrier, receiving an indication of medium preemption during the medium preemption opportunity, and refraining from transmitting on the carrier during a subsequent transmission time period based at least in part on the indication of medium preemption and a priority status.

An apparatus for communication at a wireless device is described. The apparatus may include means for transmitting a signal on a carrier in shared or unlicensed spectrum during a first transmission time period, means for identifying a medium preemption opportunity for the carrier, means for receiving an indication of medium preemption during the medium preemption opportunity, and means for refraining from transmitting on the carrier during a subsequent transmission time period based at least in part on the indication of medium preemption and a priority status.

A further apparatus for communication at a wireless device is described. The apparatus may include a processor, memory in electronic communication with the processor, and instructions stored in the memory, wherein the instructions are executable by the processor to transmit a signal on a carrier in shared or unlicensed spectrum during a first transmission time period, identify a medium preemption opportunity for the carrier, receive an indication of medium preemption during the medium preemption opportunity, and refrain from transmitting on the carrier during a subsequent transmission time period based at least in part on the indication of medium preemption and a priority status.

A non-transitory computer-readable medium storing code for communication at a wireless device is described. The code may include instructions executable to transmit a signal on a carrier in shared or unlicensed spectrum during a first transmission time period, identify a medium preemption opportunity for the carrier, receive an indication of medium preemption during the medium preemption opportunity, and refrain from transmitting on the carrier during a subsequent transmission time period based at least in part on the indication of medium preemption and a priority status.

Some examples of the methods, apparatuses, or non-transitory computer-readable medium described above may further include processes, features, means, or instructions for performing a clear channel assessment (CCA) for the shared or unlicensed spectrum, and determining that the shared or unlicensed spectrum is available for transmitting the signal during the first transmission time period based at least in part on the CCA. Additionally or alternatively, in some examples performing the CCA comprises detecting an energy profile on the shared or unlicensed spectrum or detecting a preamble transmitted on the shared or unlicensed spectrum.

In some examples of the methods, apparatuses, or non-transitory computer-readable medium described above, a length of a smallest base step of the CCA is longer than a length of the medium preemption opportunity. Additionally or alternatively, in some examples the length of the CCA is based at least in part on a priority status from an ordered set of priority statuses.

In some examples of the methods, apparatuses, or non-transitory computer-readable medium described above, each priority status from the ordered set of priority statuses is associated with a CCA counter range from a set of mutually non-overlapping CCA counter ranges, and wherein a minimum for each CCA counter range is greater than a maximum for every preceding CCA counter range. Additionally or alternatively, in some examples a frequency band comprising the shared or unlicensed spectrum is licensed to at least one prioritized network operator, and wherein the priority status is associated with a non-prioritized network operator using the shared or unlicensed spectrum. Some examples of the methods, apparatuses, or non-transitory computer-readable medium described above may further include processes, features, means, or instructions for transmitting a message to a second wireless device indicating that the carrier has been preempted.

A method of communication at a wireless device is described. The method may include identifying a communication for transmission over a carrier in shared or unlicensed spectrum by a prioritized wireless device for the shared or unlicensed spectrum, determining that a frequency range of the shared or unlicensed spectrum is being used by a non-prioritized wireless device, identifying a medium preemption opportunity for the carrier, transmitting a signal during the medium preemption opportunity using the carrier, and transmitting the communication on the carrier.

An apparatus for communication at a wireless device is described. The apparatus may include means for identifying a communication for transmission over a carrier in shared or unlicensed spectrum by a prioritized wireless device for the shared or unlicensed spectrum, means for determining that a frequency range of the shared or unlicensed spectrum is being used by a non-prioritized wireless device, means for identifying a medium preemption opportunity for the carrier, means for transmitting a signal during the medium preemption opportunity using the carrier, and means for transmitting the communication on the carrier.

A further apparatus for communication at a wireless device is described. The apparatus may include a processor, memory in electronic communication with the processor, and instructions stored in the memory, wherein the instructions are executable by the processor to identify a communication for transmission over a carrier in shared or unlicensed spectrum by a prioritized wireless device for the shared or unlicensed spectrum, determine that a frequency range of the shared or unlicensed spectrum is being used by a non-prioritized wireless device, identify a medium preemption opportunity for the carrier, transmit a signal during the medium preemption opportunity using the carrier, and transmit the communication on the carrier.

A non-transitory computer-readable medium storing code for communication at a wireless device is described. The code may include instructions executable to identify a communication for transmission over a carrier in shared or unlicensed spectrum by a prioritized wireless device for the shared or unlicensed spectrum, determine that a frequency range of the shared or unlicensed spectrum is being used by a non-prioritized wireless device, identify a medium preemption opportunity for the carrier, transmit a signal during the medium preemption opportunity using the carrier, and transmit the communication on the carrier.

In some examples of the method, apparatuses, or non-transitory computer-readable medium described above, transmitting the communication comprises transmitting signaling associated with the communication during a communication time period that includes a next medium preemption opportunity for the carrier. Additionally or alternatively, in some examples transmitting the signal comprises transmitting any of a medium preemption signal indicating preemption of a frequency range of the shared spectrum eCC by the prioritized wireless device, a random access message, a scheduling request, or combinations thereof.

In some examples of the method, apparatuses, or non-transitory computer-readable medium described above, transmitting the communication on the carrier comprises beginning transmitting the communication on the carrier prior to, at the start of, or during the medium preemption opportunity.

The conception and specific examples disclosed may be utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
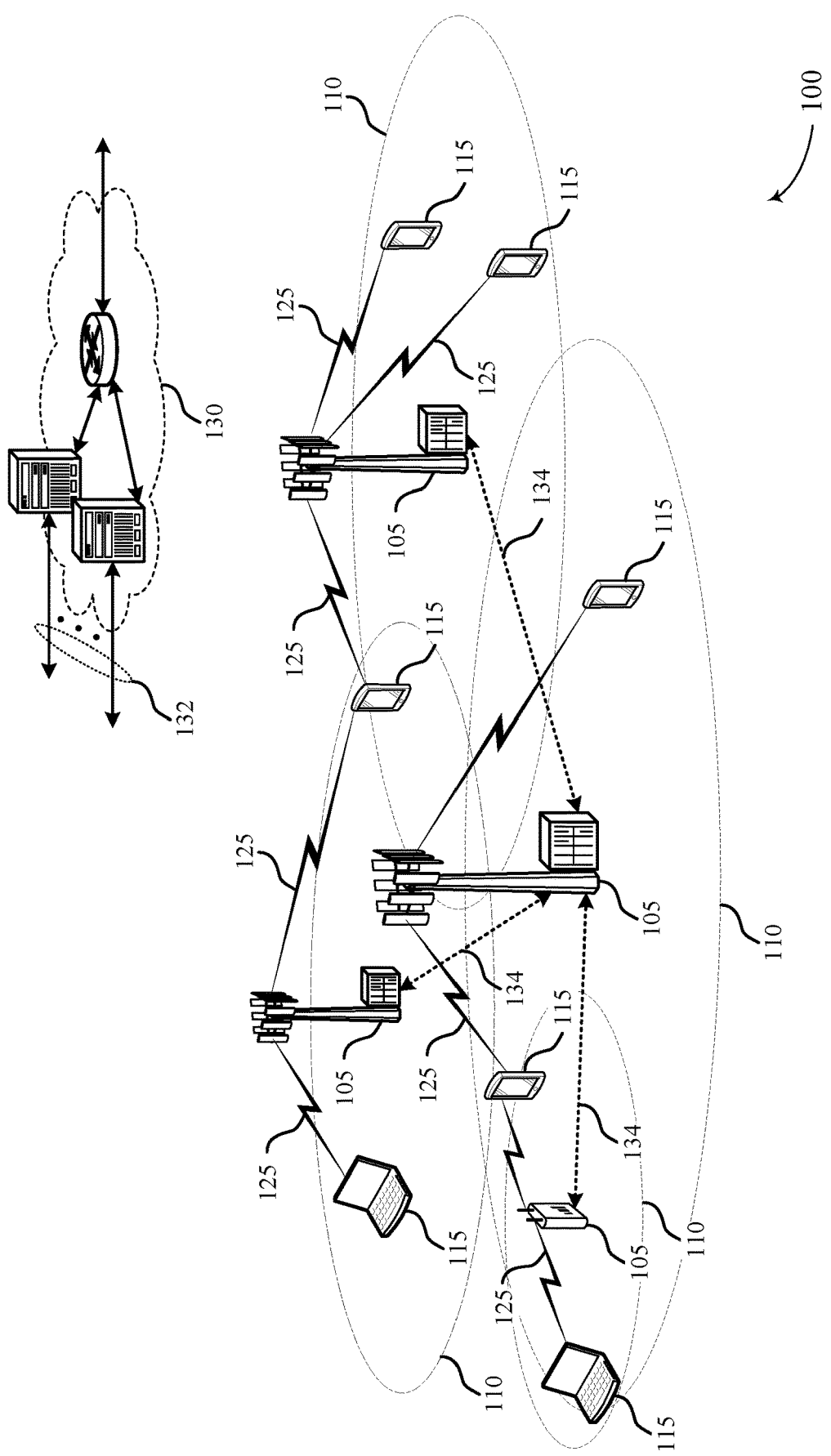
FIG. 1 illustrates an example of a wireless communications system for medium access in shared or unlicensed spectrum in accordance with various aspects of the present disclosure.

The described features generally relate to systems, methods, or apparatuses for medium access in shared spectrum. Multiple wireless devices corresponding to multiple operators may operate on a shared frequency band. Devices on a shared frequency band may operate according to a prioritization scheme, e.g., a scheme based on network operator priority levels. Non-prioritized devices may utilize clear channel assessment (CCA) procedures to access and gain control of a channel. Additionally, dedicated time intervals may be reserved for medium preemption opportunities during which non-prioritized devices may listen for prioritized devices attempting to use the channel. That is, after taking control of the channel, the non-prioritized operators may periodically cease transmitting to listen for a preemption indication. If a preemption indication is received (or a prioritized transmission is otherwise detected) the non-prioritized device may cede control of the channel to the prioritized device.

One or more carriers in a shared or unlicensed spectrum may be used to accommodate the prioritized operation of multiple wireless devices associated with different network operators. The carriers may be wide bandwidth carriers (e.g., enhanced component carriers (eCCs), etc.) within a shared spectrum frequency band. The carrier and the associated prioritization scheme may provide a prioritized operator near instantaneous access to a medium, while allowing non-prioritized operators to flexibly share the medium when the prioritized operator is inactive. In one example, multiple operators may be assigned to priority levels for operation in a designated frequency band and one operator may be designated as the prioritized operator. The given priority levels may be pre-determined and assigned to each operator such that all non-prioritized operators may yield to the prioritized operator. Devices associated with a prioritized operator may access the band without contending with other operators. Prioritized devices may also preempt an ongoing transmission and take over the medium. A non-prioritized operator may yield to the prioritized operator when attempting to access the band. In some cases, the non-prioritized operators may be further prioritized amongst themselves.

Additional physical layer structures may be utilized to accommodate a priority based carrier. For instance, a designated time interval for preemption of the channel may be used. Prioritized devices may transmit a preemption indication over the channel (i.e., using a dedicated periodic preemption opportunity). That is, preemption resources may enable a prioritized device to indicate to a non-prioritized device that the prioritized device is taking the channel. When a non-prioritized device is using the channel, the device may monitor for prioritized transmissions during the preemption opportunity, and may release control of the channel if the device detects the preemption signal. In some cases, the preemption resources may not be reserved while the prioritized operator has control of the carrier.

CCA may be used to allow multiple devices a chance to access the channel. During the CCA process, a device may wait for a back-off period before attempting to gain control of the channel. The back-off period may vary based on priority level. In some cases, multiple devices vying to access the carrier may each perform a CCA associated with a certain back-off period. A prioritized device may either forgo the CCA or may perform a CCA with no back-off period. This may enable a prioritized device to access the band at any time. In some cases, a base station, such as an evolved nodeB (eNB), or a user equipment (UE) served by the eNB and associated with the prioritized operator, may both utilize the medium preemption opportunities. Both the eNB and the UEs may monitor the medium preemption resource. In some cases, the UEs may detect that an eNB has begun transmitting over the carrier and may begin monitoring for DL control signals. The UEs may use the medium preemption resources as a contention based random access channel (RACH) or for scheduling requests (SRs). This may allow a UE to alert the eNB of the identity of the UE. A non-prioritized eNB may also detect a prioritized activity of a UE and stop any ongoing transmissions on the channel. In some examples, the prioritized eNB may notify the non-prioritized eNB to release the channel via a backhaul connection.

A non-prioritized operator may perform a CCA with back-off and may gain access to the channel after the CCA has cleared. As mentioned before, non-prioritized operators may each be assigned priority levels amongst themselves. The priority levels may be associated with different CCA counters. In one example, a higher priority operator may be assigned a smaller counter value, corresponding to a shorter backoff time, than a lower priority operator. Utilizing a CCA with prioritized consecutive precedence counter values may ensure that the higher precedence device would gain access to the channel before a non-prioritized device attempting to gain access at the same time. Utilizing an accumulative clear condition for the CCA with precedence based counter values may result in prioritization of the higher precedence operators on average. In either case (consecutive or accumulative), the duration of the medium preemption opportunity may be shorter than the minimum duration of the clear channel requirement. This may prevent a second non-prioritized device from attempting to take control from a first non-prioritized device that is already transmitting (i.e., the second non-prioritized device cannot complete a CCA during the prevention opportunity).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

In aspects, wireless communications systems utilize wireless spectrum that is partitioned into frequency bands, which may be regulated (e.g., by the Federal Communications Commission (FCC), etc.) according to various regulation schemes. For example, licensed bands may be reserved for a particular operator or purpose, and devices that are not licensed to operate on the licensed band are generally prohibited from transmitting on the band. Unlicensed bands may not be reserved for a particular operator but may be used according to various rules or protocols (e.g., limited transmit power, contention resolution protocols, etc.). Shared frequency bands may have a prioritized operator that has precedence when transmitting, but may allow for opportunistic use by non-prioritized operators.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB (Home eNB), or other suitable terminology. The geographic coverage area 110 for a base station 105 may be divided into sectors making up only a portion of the coverage area (not shown). The wireless communications system 100 may include base stations 105 of different types (e.g., macro or small cell base stations). Further, according to some aspects, there may be overlapping geographic coverage areas 110 for different technologies.

In some examples, the wireless communications system 100 is a Long Term Evolution (LTE)/LTE-Advanced (LTE-A) network. In LTE/LTE-A networks, the term evolved node B (eNB) may be used to describe the base stations 105, while the term UE may be used to describe the UEs 115. The wireless communications system 100 may be a heterogeneous LTE/LTE-A network in which different types of eNBs provide coverage for various geographical regions (e.g., geographic coverage areas 110). For example, each eNB or base station 105 may provide communication coverage for a macro cell, a small cell, or other types of cell. The term "cell" is a 3rd Generation Partnership Project (3GPP) term that may be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with a network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, a radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, other UEs, and the like.

The communication links 125 shown in wireless communications system 100 may include UL transmissions from a UE 115 to a base station 105, or DL transmissions, from a base station 105 to a UE 115. The DL transmissions may also be called forward link transmissions while the UL transmissions may be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize one or more eCCs. An eCC may be characterized by one or more features including: flexible bandwidth, variable length transmission time interval (TTIs), and modified control channel configuration. In some cases, an eCC may be associated with a carrier aggregation configuration or a dual connectivity configuration (e.g., when multiple serving cells have a suboptimal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that are not capable of monitoring the whole bandwidth or are configured to use a limited bandwidth (e.g., to conserve power).

In some cases, an eCC may utilize a variable TTI length and symbol duration. According to some aspects, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing.

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information. In some examples, a wireless communication system may utilize one or more eCCs based on wide bandwidth operation. For example, an eCC may occupy 80 MHz of bandwidth.

To access a channel, a UE 115 may read the system information of a base station 105 and transmit a RACH preamble to a base station 105. When operating on shared spectrum, the UE 115 may wait for a medium preemption opportunity to transmit the RACH preamble. In some examples the RACH preamble may be randomly selected from a set of 64 predetermined sequences. This may enable the base station 105 to distinguish between multiple UEs 115 trying to access the system simultaneously. The base station 105 may respond with a random access response that provides an UL resource grant, a timing advance, and a temporary cell radio network temporary identity (C-RNTI). The UE 115 may then transmit an RRC connection request along with a temporary mobile subscriber identity (TMSI) (e.g., if the UE 115 has previously been connected to the same wireless network) or a random identifier. The RRC connection request may also indicate a reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115) the UE 115 may repeat the RACH process by transmitting a new RACH preamble.

According to the present disclosure, wireless devices such as base stations 105 and UEs 115, may communicate using a prioritization scheme for shared frequency resources. The prioritization scheme may assign a priority to different operators and may enable devices associated with a prioritized operator to access the shared band over non-prioritized devices. For example, a non-prioritized base station 105 may begin communicating and, during the communication, periodically cease transmission for a set interval (e.g., a preemption opportunity) to listen for an indication that a prioritized base station 105 wishes to seize control of the channel. If the prioritized base station 105 begins transmitting (or transmits a medium preemption indication), the non-prioritized base station 105 may relinquish control of the channel. The prioritization techniques may be applied to a standalone component carrier or to a secondary cell in carrier aggregation systems (e.g., licensed assisted access (LAA), etc.).

Figure 2:
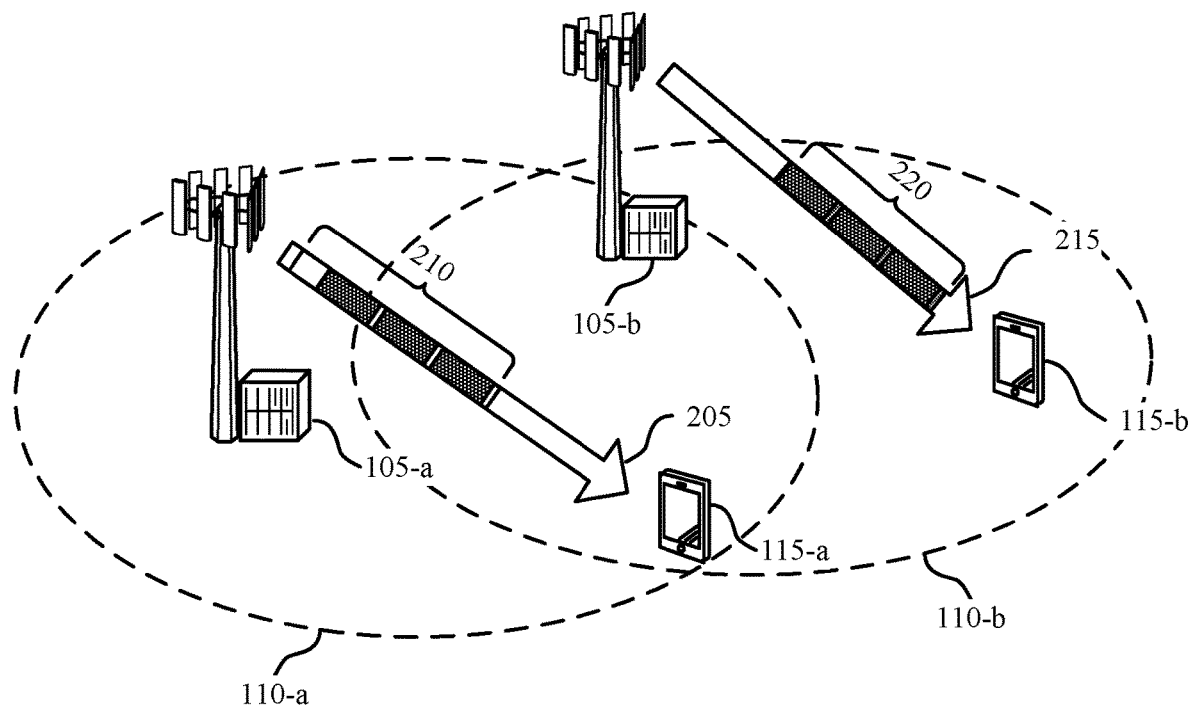
FIG. 2 illustrates an example of a wireless communications subsystem for medium access in shared or unlicensed spectrum in accordance with various aspects of the present disclosure.

FIG. 2 illustrates an example of a wireless communications subsystem 200 for medium access in shared or unlicensed spectrum in accordance with various aspects of the present disclosure. Wireless communications subsystem 200 may include base stations 105-a and 105-b, as well as UEs 115-a and 115-b, which may be examples of base stations 105 and UEs 115 described above with reference to FIG. 1.

Each of the wireless devices may operate on a shared frequency band according to a prioritization scheme based on network operator priority levels. Non-prioritized devices may utilize CCA procedures to access and gain control of a channel. Additionally, dedicated time intervals may be reserved for medium preemption opportunities during which non-prioritized devices may listen for prioritized devices attempting to use the channel. In some cases, a prioritized operator may be a preferred network operator. In other cases, a prioritized operator may be a government operator (e.g., a government operated network or another wireless device such as a radar station). Prioritization may also be based on device type (e.g., a user operated mobile device may have a different priority level than a machine-type communications device associated with the same operator).

Base station 105-a and UE 115-a may represent non-prioritized devices (i.e., devices associated with a non-prioritized network operator) that communicate with one another via a carrier 205 (although illustrated as downlink, carrier 205 may include uplink transmissions, in some cases) on a shared frequency band. Signal transmission 210 may represent a communication session over carrier 205 and may include a CCA process and periodic medium preemption opportunities during which both UE 115-a and base station 105-a listen for transmissions from prioritized devices.

Base station 105-b and UE 115-b may represent prioritized devices (i.e., devices associated with a prioritized network operator) using the same or overlapping portions of shared frequency band as base station 105-a and UE 115-a. Base station 105-b and UE 115-b may communicate via a carrier 215 (e.g., an UL or DL carrier). Carrier 215 may utilize the same or overlapping portions of a shared frequency band as carrier 205. Coverage area 110-b for carrier 215 may overlap with coverage area 110-a for carrier 205 used by non-prioritized devices including base station 105-a and UE 115-a. Signal transmission 220 may represent a communication session over carrier 215, and may include the transmission of a medium preemption indicator and a subsequent data transmission.

According to one or more aspects, base stations 105-a and 105-b, as well as UEs 115-a and 115-b, may use CCA procedures to access channels of the shared frequency band. In some cases, one or more of shared spectrum carriers 205 and 215 may be eCCs operating in the shared frequency band. For example, base station 105-a may utilize a CCA procedure to win access to and control of the shared frequency band. Base station 105-a may then begin signal transmission 210 to UE 115-a via downlink 205. During signal transmission 210, base station 105-a may periodically pause transmission to listen for a preemption indication from a prioritized device, such as base station 105-b or UE 115-b. In some cases, base station 105-a may monitor the energy of the shared frequency band during a preemption opportunity to determine if a prioritized device has taken control of the channel.

If base station 105-b has data to transmit, base station 105-b may preempt the signal transmission 210 from base station 105-a. For example, base station 105-b may either begin transmitting over the shared frequency band immediately, or wait to transmit a preemption indication using a dedicated preemption opportunity. Base station 105-b may also use a backhaul link to send the preemption indication to base station 105-a. In other examples, UE 115-a and UE 115-b may similarly observe preemption opportunities and send preemption indicators, respectively, during uplink transmissions.

Base stations 105-a and 105-b, as well as UEs 115-a and 115-b may operate on the shared frequency band using eCCs associated with their respective networks. The eCCs may support both synchronous and asynchronous operations. In synchronous operation, base station 105-b may monitor the shared frequency band if base station 105-b wishes to gain control of the eCC. If base station 105-b determines that a non-prioritized operator (such as base station 105-a) is transmitting, base station 105-b may wait for a subsequent preemption opportunity to transmit a preemption indication and begin unrestricted signal transmission 220 at the preemption opportunity. Base station 105-a may monitor the dedicated preemption resources and cease transmission upon receipt of the preemption indication. In some cases, non-prioritized base station 105-a may synchronize (e.g., for preemption opportunities) with prioritized base station 105-b by monitoring signals from base station 105-a (e.g., a beacon, synchronization signals, etc.). Prioritized UE 115-b may also monitor the dedicated preemption resources and continuously monitor the DL control channel based on an indication of preemption by base station 105-b. During asynchronous operation, base station 105-b may begin an unrestricted signal transmission 220 without monitoring the shared frequency band. In some cases, base station 105-b may transmit simultaneously with base station 105-a. At a subsequent preemption opportunity base station 105-a may perform energy detection of the channel and cease transmission after determining a prioritized device (e.g., base station 105-b or UE 115-b) has taken over the channel or based on the receipt of a preemption indicator.

Figure 3A:
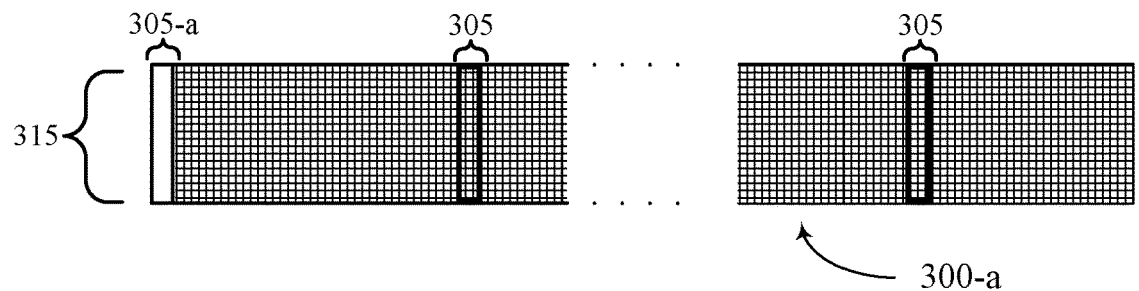
FIGS. 3A-3F illustrate examples of a timing diagram for medium access in shared or unlicensed spectrum in accordance with various aspects of the present disclosure.
Figure 3B:
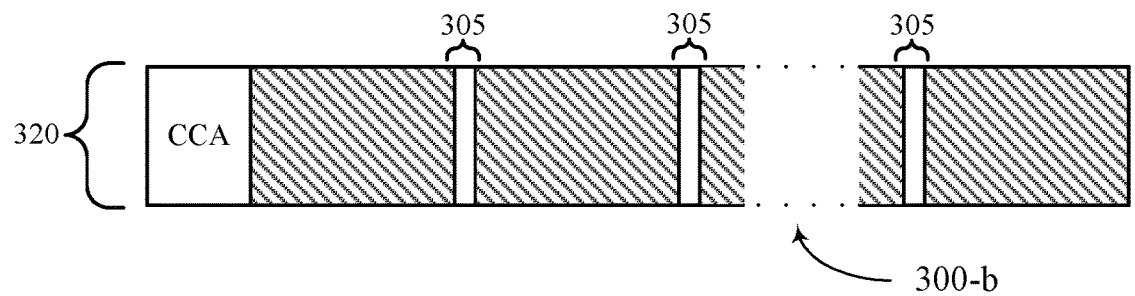
Figure 3C:
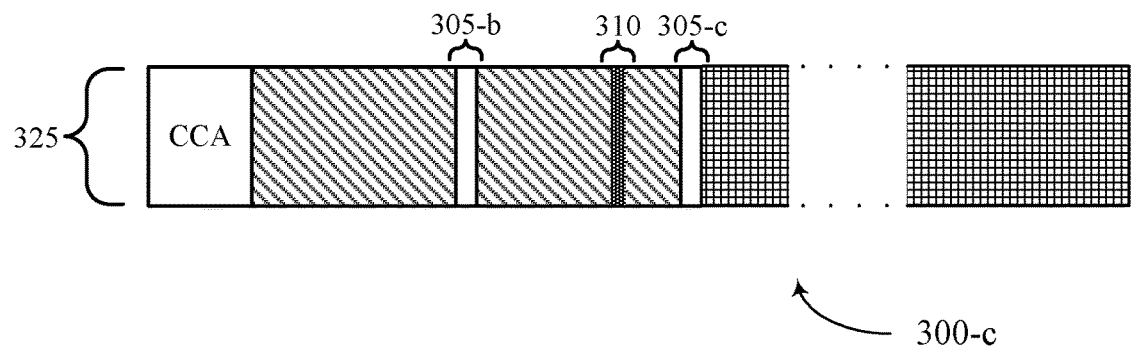

FIGS. 3A-3C illustrate example timing diagrams of medium access in shared or unlicensed spectrum in accordance with various aspects of the present disclosure. Timing diagrams 300-a, 300-b, and 300-c may illustrate aspects of prioritized and non-prioritized transmissions on a shared frequency bandwidth. In some cases, a non-prioritized device (i.e., a first base station 105 or a first UE 115) and a prioritized device (i.e., a second base station 105 or UE 115) may operate on the same channel as described above with reference to FIGS. 1-2. Timing diagrams 300-a, 300-b, and 300-c may include preemption opportunities 305 in which a wireless device may monitor dedicated preemption resources for an indication of preemption by a prioritized device.

In one example, prioritized communication session 315 may be associated with a prioritized device communicating during a first time period, as shown in FIG. 3A. Non-prioritized communication session 320 may be associated with a non-prioritized device communicating during a second time period, as shown in FIG. 3B. Shared communication session 325 may illustrate both prioritized and non-prioritized operation during a third time period. The prioritized device may begin signal transmission at the termination of medium preemption opportunity 305-a and may transmit through subsequent preemption opportunities 305, as illustrated by timing diagram 300-a in FIG. 3A. In some cases, the prioritized device may transmit a preemption indicator during medium preemption opportunity 305-a.

As shown in timing diagram 300-b of FIG. 3B, a non-prioritized communication session 320 may begin with a CCA. The communication session 320 may continue if the channel is clear. In some cases, a non-prioritized device may cease transmission during periodic preemption opportunities 305, as shown in FIG. 3B.

In some cases, a non-prioritized device may operate over the same shared frequency band as a prioritized device, as illustrated by shared communication session 325 of timing diagram 300-c in FIG. 3C. For example, during shared communication session 325 a non-prioritized device may perform a CCA to ensure the channel is clear and if clear, the non-prioritized device may begin transmitting. The non-prioritized device may halt transmission to observe periodic preemption opportunity 305-*b*. If no indication of preemption is observed by the non-prioritized device, transmission may continue. In some cases, a prioritized device may wish to take over the channel and may perform a channel monitoring operation 310 (e.g., a CCA with a reduced or zero back-off counter) during the non-prioritized transmission. After determining the channel is being used, the prioritized device may wait for preemption opportunity 305-*c* to transmit a preemption indication. In certain examples, the prioritized device may detect one or more preemption opportunities 305 (e.g., by channel sensing). In other examples, the prioritized device may be synchronized with the non-prioritized device and may then determine or obtain the timing for one or more preemption opportunities 305. If the preemption opportunities 305 are known by the prioritized device, the prioritized device may wait until the preemption opportunity (e.g., preemption opportunity 305-*c*) to transmit the preemption indication. In any case, the non-prioritized device may monitor the spectrum during the preemption opportunity 305-*c* and may yield control of the channel to the prioritized device for the time period after the preemption opportunity 305-*c* upon detection of a preemption indicator.

Figure 3D:
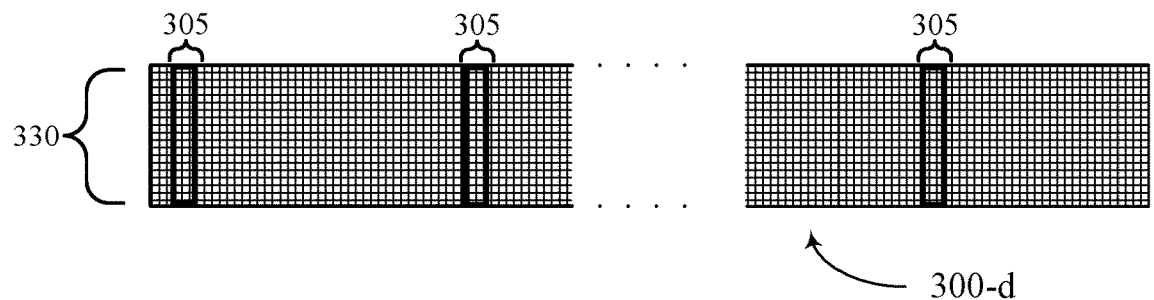
Figure 3E:
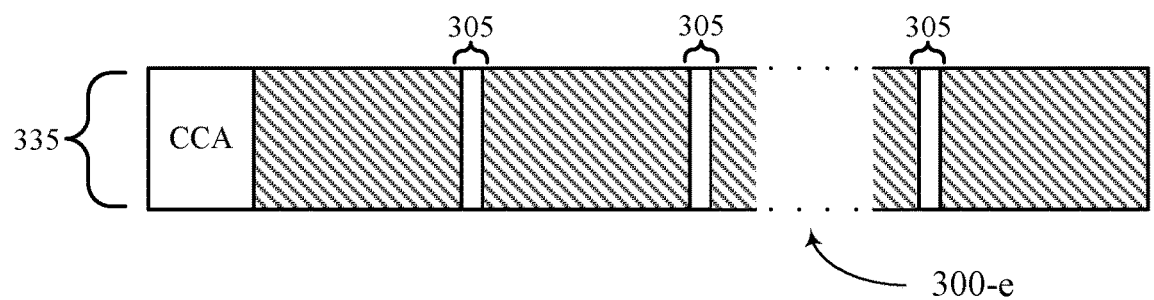
Figure 3F:
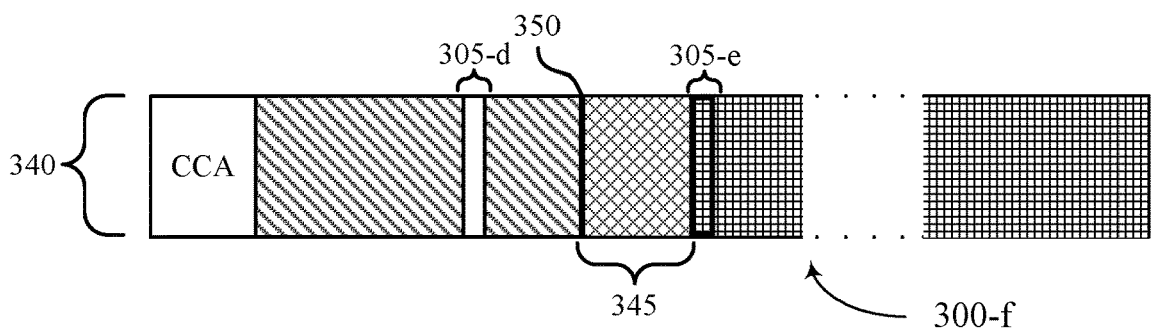

FIGS. 3D-3F illustrate examples of a timing diagrams 300-*d*, 300-*e*, 300-*f* for medium access in shared or unlicensed spectrum in accordance with various aspects of the present disclosure. Timing diagrams 300-*d*, 300-*e*, 300-*f* may illustrate aspects of prioritized and non-prioritized transmissions over a shared frequency band. In some cases, a non-prioritized device (i.e., a first base station 105 or a first UE 115) and a prioritized device (i.e., a second base station 105 or UE 115) may operate on the same channel as described above with reference to FIGS. 1-2. Timing diagrams 300-*d*, 300-*e*, 300-*f* may include preemption opportunities 305 in which a wireless device may monitor dedicated preemption resources for an indication of a prioritized preemption.

In one example, prioritized communication session 330 may be associated with a prioritized device during a first time period, as shown in FIG. 3D. Non-prioritized communication session 335 may be associated with a non-prioritized device during a second time period, as shown in FIG. 3E. Shared communication session 340 may include combined prioritized and non-prioritized operation during a third time period, as shown in FIG. 3F. The prioritized communication session 330 may begin immediately with a signal transmission by the prioritized device and may continue through subsequent preemption opportunities 305, as illustrated by timing diagram 300-*d* in FIG. 3D. In some cases, prioritized communication session 330 may begin prior to, during, or after a medium preemption opportunity 305, but in other cases the communication session 330 may begin at an arbitrary time.

As shown in timing diagram 300-*e* of FIG. 3E, a non-prioritized communication session 335 may begin with a CCA. The communication session 335 may continue if the channel is clear. In some cases, a non-prioritized device may cease transmission during periodic preemption opportunities 305.

A non-prioritized device may share a channel with a prioritized device during a shared communication session 340, as illustrated by timing diagram 300-*f* in FIG. 3F. During shared communication session 340 a non-prioritized device may perform a CCA to win access to the channel and begin transmitting. The non-prioritized device may then halt transmission to observe periodic preemption opportunity 305-*d*. If no indication of preemption is observed by the non-prioritized device, transmission may continue. In some cases, a prioritized device may begin immediate signal transmission at arbitrary time 350. The transmission by the prioritized device may occur concurrently with a non-prioritized communication session (i.e., both devices may simultaneously attempt to use the shared frequency band) as indicated during the simultaneous transmission period 345. At preemption opportunity 305-*e* the non-prioritized device may monitor the frequency band to determine if there is an ongoing prioritized transmission, while the prioritized device may continue to transmit without observing the preemption opportunity (though in some cases, the prioritized device may transmit a preemption indicator). In some examples, monitoring the channel includes performing energy detection on the channel. After determining that a prioritized transmission is occurring (e.g., detection of signal energy from the transmission by the prioritized device or detection of a preemption indicator, etc.), the non-prioritized device may cease transmission and yield control of the channel to the prioritized device. In some cases, the non-prioritized device may receive a preemption indication from the prioritized device in addition to or alternative to detecting energy on the channel.

Figure 4A:
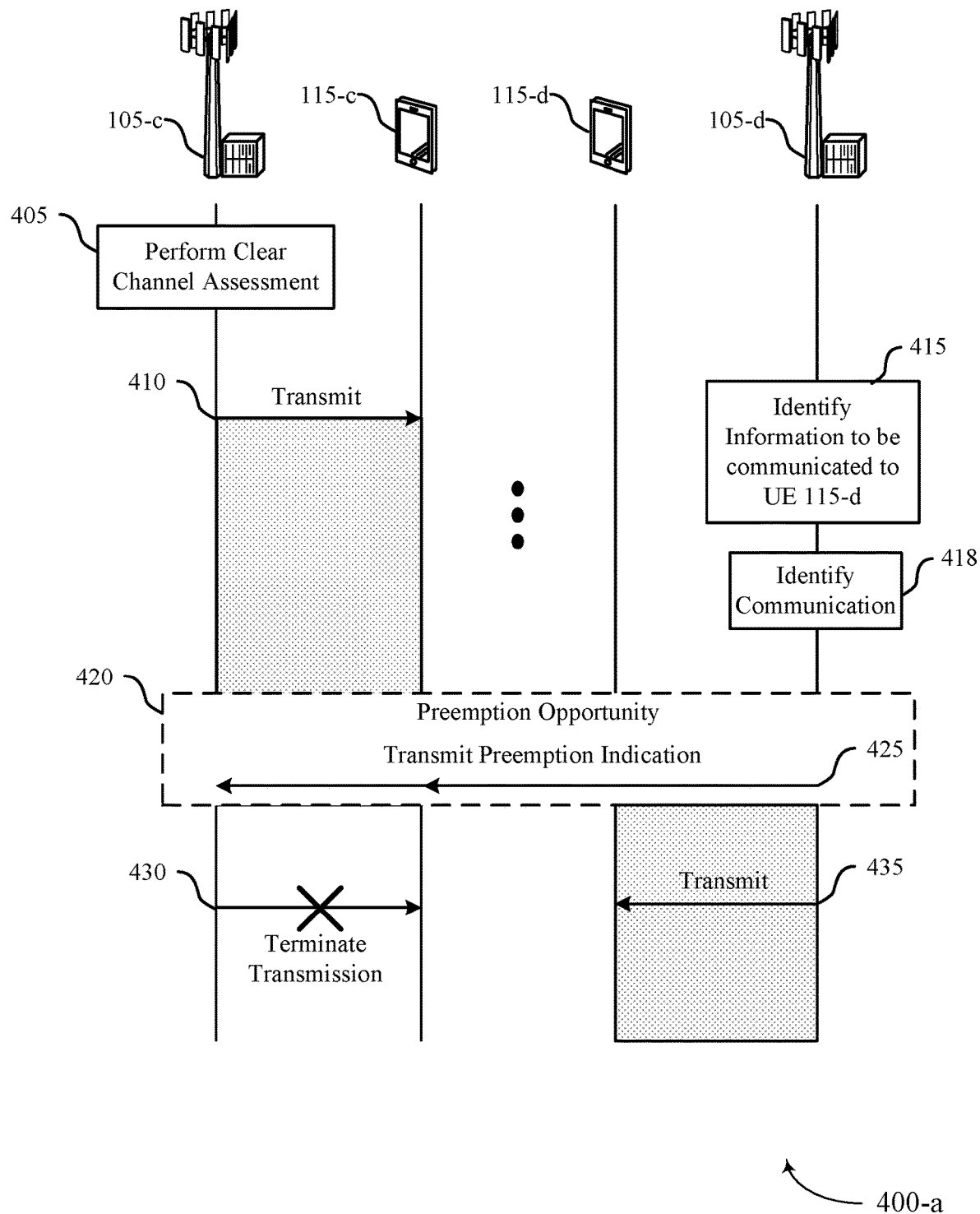
FIGS. 4A and 4B illustrate examples of a process flow for medium access in shared or unlicensed spectrum in accordance with various aspects of the present disclosure.

FIG. 4A illustrates an example of a process flow 400-*a* for medium access in shared or unlicensed spectrum in accordance with various aspects of the present disclosure. Process flow 400-*a* may include a non-prioritized UE 115-*c* and a prioritized UE 115-*d*, which may be examples of a UE 115 described above with reference to FIGS. 1-2. Process flow 400-*a* may also include a non-prioritized base station 105-*c* and a prioritized base station 105-*d*, which may be examples of a base station 105 described above with reference to FIGS. 1-2. Prioritized UE 115-*d* and base station 105-*d* may be associated with a prioritized operator, while non-prioritized UE 115-*c* and base station 105-*c* may be associated with a non-prioritized operator. The devices may all share a frequency band (e.g., using shared spectrum eCCs). For example, UE 115-*c* and base station 105-*c* may communicate via a first shared spectrum eCC and UE 115-*d* and base station 105-*d* may communicate via a second shared spectrum eCC, which may have the same frequency range or an overlapping frequency range with the first shared spectrum eCC). The spectrum may be licensed to a prioritized network operator and/or shared with other, non-prioritized network operators.

Base station 105-*c* may perform a CCA 405 on the shared frequency band. Base station 105-*c* may determine that the channel is available for transmission based on the CCA 405. In some examples, performing the CCA 405 includes detecting an energy profile on the channel or detecting a preamble transmitted on the channel. In some examples, the minimum length of the CCA 405 may be longer than the length of a medium preemption opportunity. For example, the length of the smallest interval in the process of clearing the CCA may be longer than the medium preemption opportunity interval. In some cases, a non-prioritized operator may be further prioritized against additional non-prioritized operators sharing the channel. Additionally or alternatively, the length of the CCA may be based on a priority status (e.g., from an ordered set of priority statuses based on network operators or device types).

The prioritization levels for the non-prioritized operators may determine the allocation of CCA counter ranges for prioritized devices. In some cases, the CCA counter ranges may be chosen from a set of mutually non-overlapping CCA counter ranges where a minimum for each CCA counter range is greater than a maximum for every preceding CCA counter range. For example, if base station 105-*c* has a priority level 2 and base station 105-*d* has priority level 3, then the range for base station 105-*c* might be given by $\{T_{min}(2), T_{max}(2)\}$ and the range for base station 105-*d* may be given by $\{T_{min}(3), T_{max}(3)\}$ where $T_{max}(2) < T_{min}(3)$. During CCA procedures, each of base-station 105-*c* and 105-*d* backs off (i.e., ceases transmission) for an interval (e.g., randomly selected, etc.) between $T_{min}$ and $T_{max}$. Thus, with priority level 2 base station 105-*c* having a $T_{max}(2)$ less than $T_{min}(3)$, base-station 105-*c* will win the channel over priority level 3 base station 105-*d* (and all other base stations with priority level 3 or greater). Among base stations with the same priority level (i.e., two priority level 3 base stations), different (e.g., random) back off intervals may mitigate transmission collisions while giving each base station equal access (on average) to the channel.

Base station 105-*c* may transmit a signal 410 after winning the channel based on the CCA procedure. Base station 105-*c* may continue transmitting until transmission is complete or until base station 105-*c* is preempted by a prioritized device.

Base station 105-*d* may identify a communication 415 to be transmitted over the shared frequency band to UE 115-*d* and may begin to monitor the channel to determine whether the shared spectrum is being used by a non-prioritized wireless device. Base station 105-*d* may then identify the communication session (i.e., the ongoing transmission 410) of base station 105-*c* over the shared frequency band at 418. After detecting usage of the shared spectrum, base station 105-*d* may wait for a preemption opportunity before transmitting the communication.

In aspects, a preemption opportunity 420 may be configured for a shared channel and base station 105-*c*, base station 105-*d*, UE 115-*c*, and UE 115-*d* may identify the medium preemption opportunity 420 for the shared spectrum. In some cases, dedicated resources (e.g., a predetermined periodic time slot) may be allocated to accommodate the preemption opportunity 420. In some cases, each device on the channel may use the dedicated resources to listen to the medium preemption opportunity 420. In some cases, base station 105-*c* and UE 115-*c* (i.e., non-prioritized devices) may cease transmitting over the shared frequency band to listen for a preemption indication from prioritized base station 105-*d* (or UE 115-*d*). During the preemption opportunity 420, prioritized devices may transmit a medium preemption signal, a random access message, or a scheduling request.

Base station 105-*c*, UE 115-*c*, and/or UE 115-*d* may receive an indication of medium preemption 425 during the medium preemption opportunity. In some cases, UE 115-*d* may only receive an indication of medium preemption 425 if the indication of preemption includes control information for UE 115-*d*. Base station 105-*d* may transmit the medium preemption signal 425 and indicate preemption of the channel. Additionally or alternatively, UE 115-*d* may transmit the medium preemption signal 425 during the medium preemption opportunity 420. In some cases, base station 105-*d* may notify other base stations of medium preemption by the prioritized operator associated with base station 105-*d* and UE 115-*d*. For example, base station 105-*d* may send an indication of medium preemption to base station 105-*c* over a backhaul interface based on receiving the medium preemption signal from UE 115-*d*. Indicating medium preemption over a backhaul interface to other base stations that may be opportunistically using the medium may alleviate hidden node issues that may arise in medium preemption.

Base station 105-*c* may refrain from transmitting on the shared spectrum (e.g., on the associated eCC) during the time period 430 subsequent to the preemption opportunity based on the indication of medium preemption from a prioritized device in preemption opportunity 420.

Base station 105-*d* may transmit the communication 435 (i.e., the identified information to be transmitted) on the shared spectrum. In some examples, transmitting the communication 435 on the shared spectrum occurs prior to, during, or after the preemption opportunity.

Figure 4B:
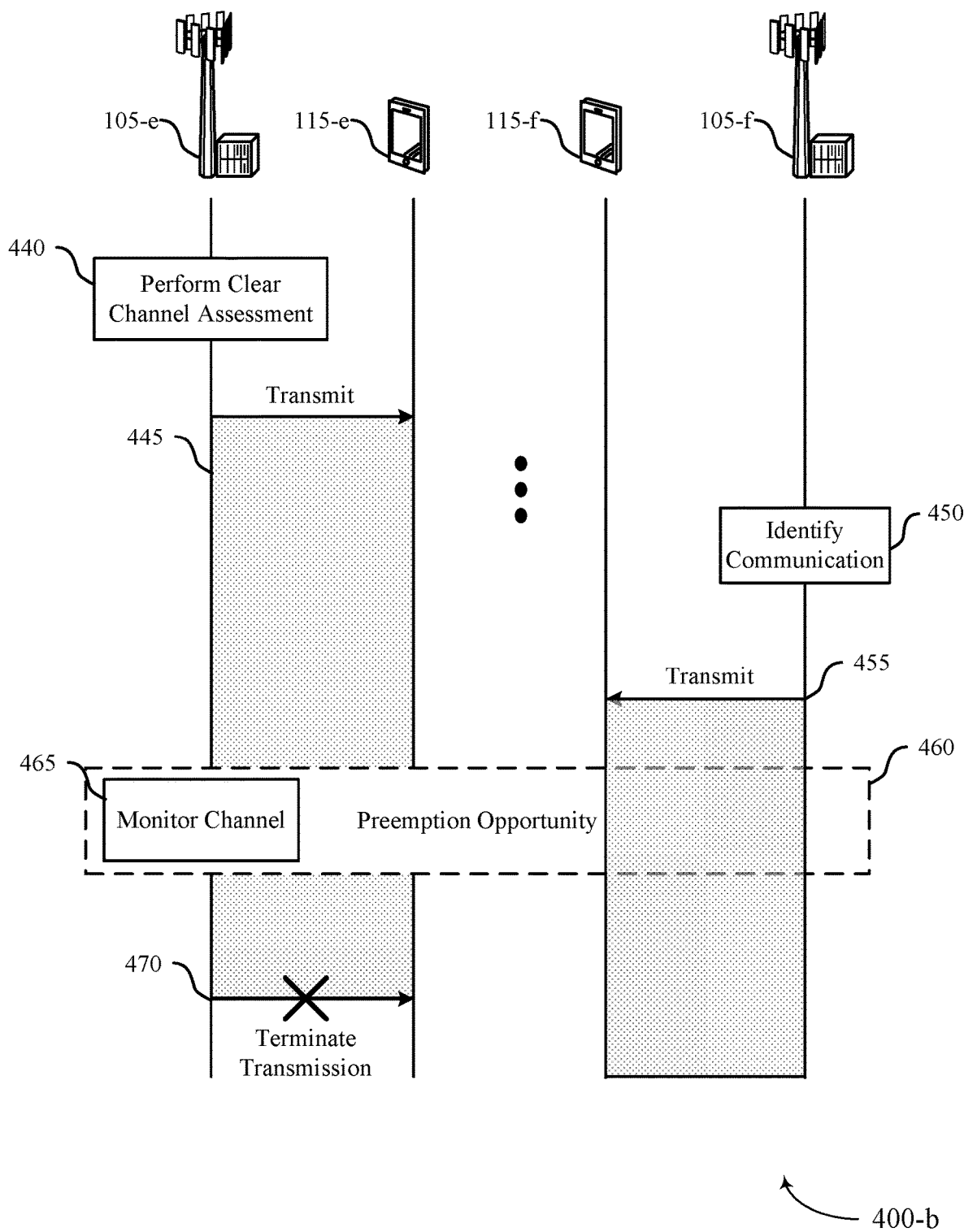

FIG. 4B illustrates an example of a process flow 400-*b* for medium access in shared or unlicensed spectrum in accordance with various aspects of the present disclosure. Process flow 400-*b* may include a non-prioritized UE 115-*e* and a prioritized UE 115-*f*, which may be examples of a UE 115 described above with reference to FIGS. 1-2. Process flow 400-*b* may also include a non-prioritized base station 105-*e* and a prioritized base station 105-*f*, which may be examples of a base station 105 described above with reference to FIGS. 1-2. Prioritized UE 115-*f* and base station 105-*f* may be associated with a prioritized operator, while non-prioritized UE 115-*e* and base station 105-*e* may be associated with a non-prioritized operator. The devices may all share a frequency band (e.g., using shared spectrum eCCs). The spectrum may be licensed to a prioritized network operator and/or shared with a non-prioritized network operator.

Base station 105-*e* may perform CCA 440 for the shared spectrum. Base station 105-*e* may determine that the channel may be available for transmission based on the CCA 440.

Base station 105-*e* may transmit a signal 445 after winning the channel based on the CCA procedure. Base station 105-*e* may continue transmitting until transmission is completed or until base station 105-*e* is preempted by a prioritized device.

Base station 105-*f* may identify a communication 450 (i.e., information addressed to UE 115-*f*) for transmission over the eCC.

Base station 105-*f* may begin immediate transmission 455 simultaneously with the transmission 445 from base station 105-*e*. In some cases, the transmission 455 may continue through a subsequent preemption opportunity.

Base station 105-*e*, base station 105-*f*, UE 115-*e*, and UE 115-*f* may identify a medium preemption opportunity 460 for the shared spectrum. Base station 105-*f* may continue to transmit through the medium preemption opportunity 460. In some cases, base station 105-*e* and UE 115-*e* may cease transmitting over the eCC to listen for a preemption indication (or a transmission) from a prioritized device. During the preemption opportunity 460, prioritized devices may transmit any of a medium preemption signal, a random access message, a scheduling request, a data packet, or any other suitable signals, data, or messages.

Base station 105-*e* may perform channel monitoring 465 to determine if another device is using the channel. In some cases, channel monitoring 465 includes detecting an energy profile on the channel or monitoring for a preamble transmitted on the channel. If base station 105-*e* detects a transmission on the channel, base station 105-*e* may determine that a prioritized operator has preempted control of the channel.

Base station 105-*e* may refrain from transmitting on the shared spectrum during a subsequent transmission time period 470 based on the indication of medium preemption from the prioritized device. Base station 105-*f* may continue to transmit until termination of the communication.

Figure 5:
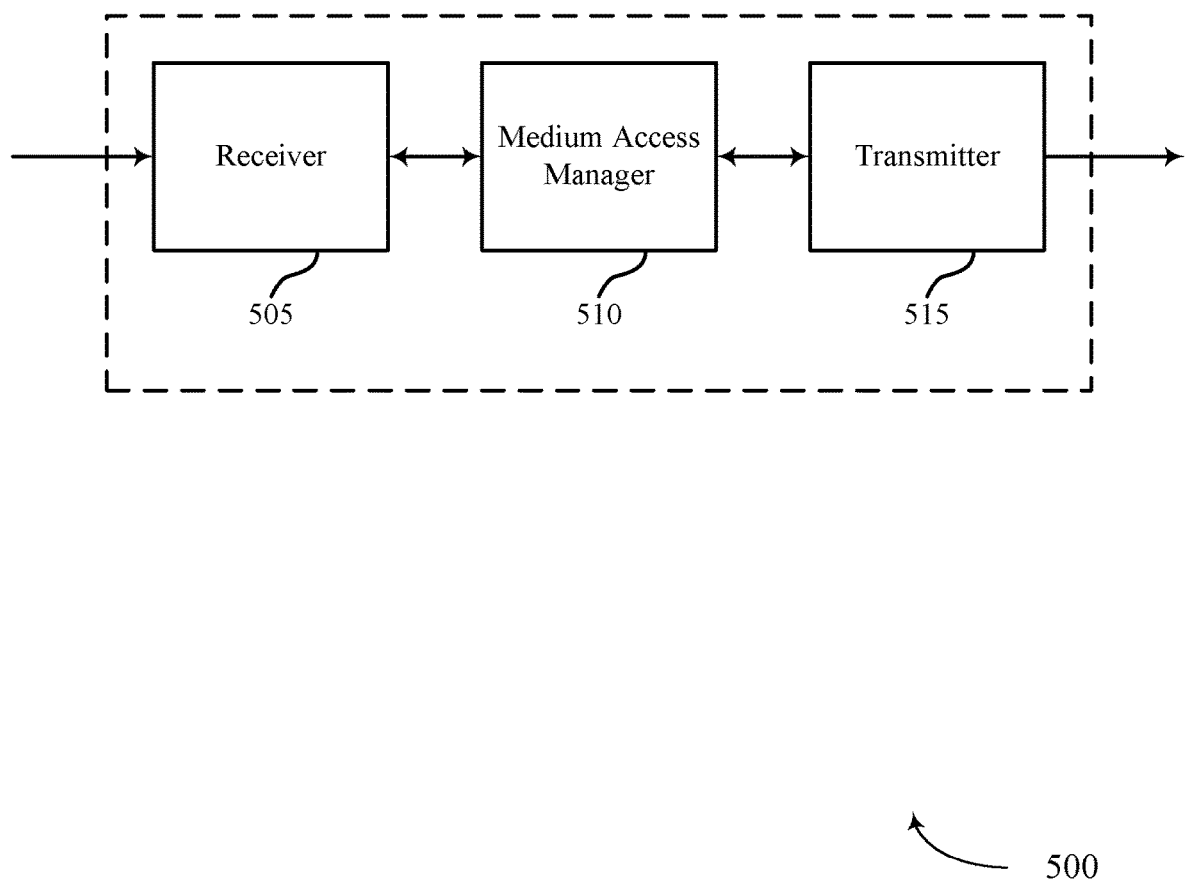
FIG. 5 shows a block diagram of a user equipment (UE) configured for medium access in shared or unlicensed spectrum in accordance with various aspects of the present disclosure.

FIG. 5 shows a block diagram of a wireless device 500 configured for medium access in shared or unlicensed spectrum in accordance with various aspects of the present disclosure. Wireless device 500 may be an example of aspects of a UE 115 or a base station 105 described with reference to FIGS. 1-4. Wireless device 500 may include a receiver 505, a medium access manager 510, or a transmitter 515. Wireless device 500 may also include a processor. Each of these components may be in communication with each other.

The receiver 505 may receive information such as packets, user data, or control information associated with various information channels (e.g., control channels, data channels, and information related to medium access for carriers in shared or unlicensed spectrum, etc.). Information may be passed on to the medium access manager 510, and to other components of wireless device 500.

The medium access manager 510 may transmit a signal on a carrier (e.g., eCC, etc.) in shared or unlicensed spectrum during a first transmission time period, identify a medium preemption opportunity for the carrier, receive an indication of medium preemption during the medium preemption opportunity, and refrain from transmitting on the carrier during a subsequent transmission time period based at least in part on the indication of medium preemption and a priority status (i.e., a non-prioritized status relative to another device transmitting on the same channel).

The transmitter 515 may transmit signals received from other components of wireless device 500. In some examples, the transmitter 515 may be collocated with the receiver 505 in a transceiver. The transmitter 515 may include a single antenna, or may include a plurality of antennas. In some examples, the transmitter 515 may transmit a communication (in the form of a wireless signal) on a carrier (e.g., eCC, etc.) in shared or unlicensed spectrum during a transmission time period. In some cases, the transmission time period may be distinct from one or more time periods dedicated for preemption opportunity. In some examples, transmitting the communication comprises transmitting signaling associated with the communication during a communication time period that includes the next medium preemption opportunity for the carrier. In some examples, transmitting the signal comprises transmitting any of a medium preemption signal indicating preemption of a frequency range of the shared or unlicensed spectrum by the prioritized wireless device, a random access message, a scheduling request, or combinations thereof. In some examples, transmitting the communication on the carrier comprises transmitting the communication on the carrier subsequent to the medium preemption opportunity.

Figure 6:
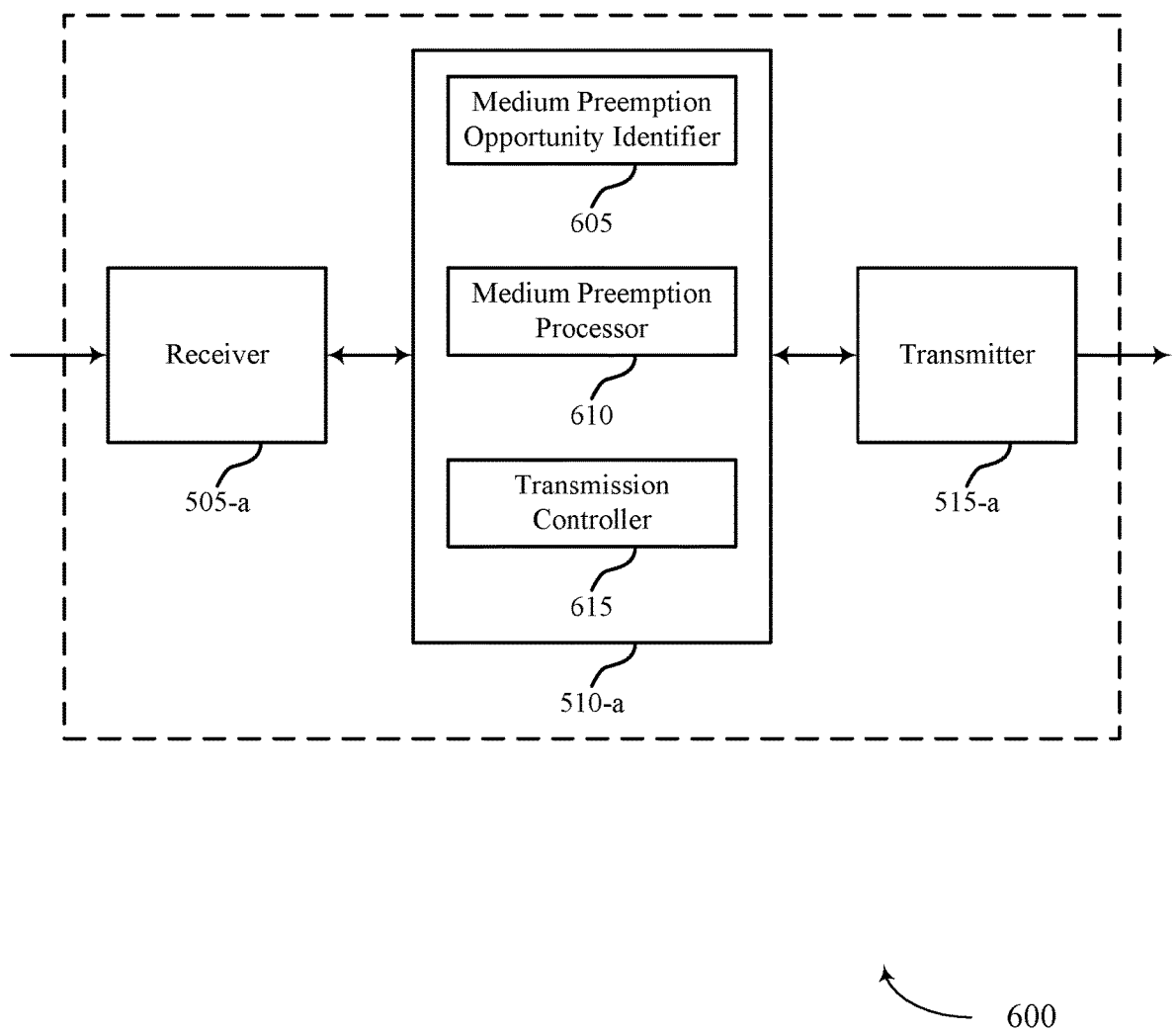
FIG. 6 shows a block diagram of a UE configured for medium access in shared or unlicensed spectrum in accordance with various aspects of the present disclosure.

FIG. 6 shows a block diagram of a wireless device 600 for medium access in shared or unlicensed spectrum in accordance with various aspects of the present disclosure. Wireless device 600 may be an example of aspects of a wireless device 500, a base station 105, and/or a UE 115 described with reference to FIGS. 1-5. Wireless device 600 may include a receiver 505-a, a medium access manager 510-a, or a transmitter 515-a. Wireless device 600 may also include a processor. Each of these components may be in communication with each other. The medium access manager 510-a may also include a medium preemption opportunity identifier 605, a medium preemption processor 610, and a transmission controller 615.

The receiver 505-a may receive information which may be passed on to medium access manager 510-a, and/or to other components of wireless device 600. The medium access manager 510-a may perform the operations described above with reference to FIG. 5. The transmitter 515-a may transmit signals received from other components of wireless device 600.

The medium preemption opportunity identifier 605 may identify a medium preemption opportunity for the carrier in shared or unlicensed spectrum as described above with reference to FIGS. 2-4. In some examples, a frequency band comprising the carrier may be licensed to at least one prioritized network operator, and the priority status may be associated with a non-prioritized network operator using the shared spectrum.

The medium preemption processor 610 may receive an indication of medium preemption during the medium preemption opportunity as described above with reference to FIGS. 2-4. The medium preemption processor 610 may also transmit a signal (i.e., a medium preemption signal) during the medium preemption opportunity using the carrier.

The transmission controller 615 may cause the device to refrain from transmitting on the carrier during a subsequent transmission time period based at least in part on the indication of medium preemption and a priority status (e.g., a non-prioritized status relative to another device transmitting on the same channel) as described above with reference to FIGS. 2-4.

The components of wireless device 500 and wireless device 600 may, individually or collectively, be implemented with at least one Application-specific integrated circuit (ASIC) adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field-programmable gate array (FPGA), or any other semi-custom IC), which may be programmed in any manner known in the art. The functions of each unit may also be implemented, in whole or in part, with instructions embodied in a memory, formatted to be executed by one or more general or application-specific processors.

Figure 7:
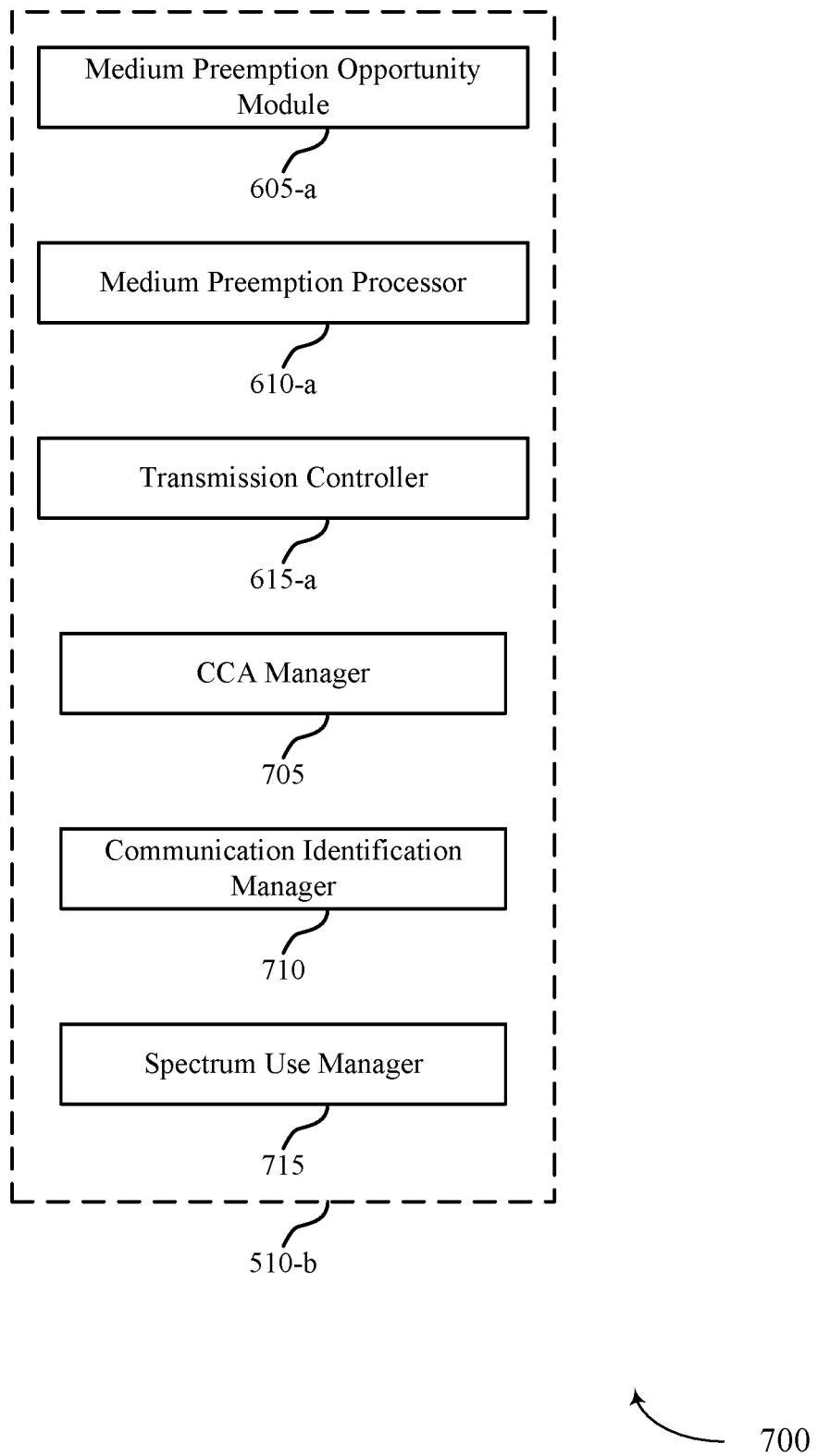
FIG. 7 shows a block diagram of a medium access manager configured for medium access in shared or unlicensed spectrum in accordance with various aspects of the present disclosure.

FIG. 7 shows a block diagram 700 of a medium access manager 510-b which may be a component of a wireless device 500 or a wireless device 600 for medium access in shared or unlicensed spectrum in accordance with various aspects of the present disclosure. The medium access manager 510-b may be an example of aspects of a medium access manager 510 described with reference to FIGS. 5-6. The medium access manager 510-b may include a medium preemption opportunity identifier 605-a, a medium preemption processor 610-a, and a transmission controller 615-a. Each of these components may perform the functions described above with reference to FIG. 6. The medium access manager 510-b may also include a CCA manager 705, a communication identification manager 710, and a spectrum use manager 715.

The CCA manage 705 may perform a CCA for the shared spectrum eCC as described above with reference to FIGS. 2-4. In some cases, the CCA manager 705 may determine that the shared or unlicensed spectrum is available for transmitting the signal during the first transmission time period based at least in part on the CCA. In some cases, the channel will not be available. In some examples, performing the CCA comprises detecting an energy profile on the shared or unlicensed spectrum or detecting a preamble transmitted on a carrier of the shared or unlicensed spectrum. In some examples, the length of the CCA may be longer than the length of the medium preemption opportunity. For example, the length of the CCA may depend on a priority level and whether the CCA period is counted consecutively or accumulatively, but the minimum length may always be greater than the length of the preemption opportunity. In some examples, the length of the CCA may be based at least in part on a priority status from an ordered set of priority statuses. In some examples, each priority status from the ordered set of priority statuses may be associated with a CCA counter range from a set of mutually non-overlapping CCA counter ranges, and wherein a minimum for each CCA counter range may be greater than a maximum for every preceding CCA counter range.

The communication identification manager 710 may identify a communication for transmission over a carrier in shared or unlicensed spectrum by a prioritized wireless device for the shared or unlicensed spectrum as described above with reference to FIGS. 2-4.

The spectrum use manager 715 may determine that a frequency range of the shared or unlicensed spectrum is being used by a non-prioritized wireless device as described above with reference to FIGS. 2-4.

Figure 8A:
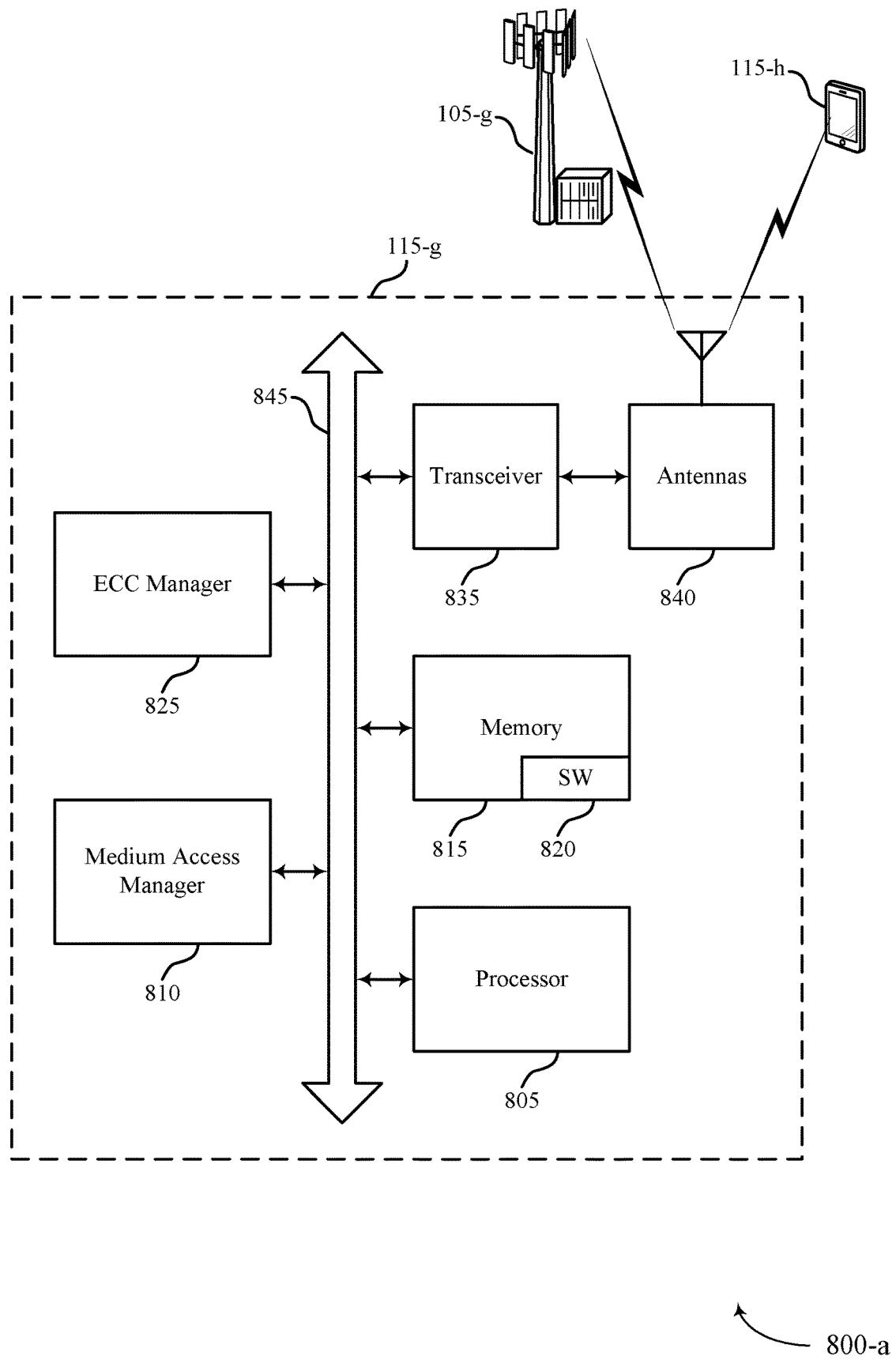
FIG. 8A illustrates a block diagram of a system including a UE configured for medium access in shared or unlicensed spectrum in accordance with various aspects of the present disclosure.

FIG. 8A shows a diagram of a system 800-a including a UE 115 configured for medium access in shared or unlicensed spectrum in accordance with various aspects of the present disclosure. System 800-a may include UE 115-g, which may be an example of a wireless device 500, a wireless device 600, or a UE 115 described above with reference to FIGS. 1,2, and 5-7. UE 115-g may include a medium access manager 810, which may be an example of a medium access manager 510 described with reference to FIGS. 5-7. UE 115-g may also include eCC manager 825. UE 115-g may also include components for bi-directional voice and data communications including components for transmitting communications and components for receiving communications. For example, UE 115-g may communicate bi-directionally with base station 105-g and/or UE 115-h.

The eCC manager 825 may enable the use of eCC capabilities by UE 115-g. For example, eCC manager 825 may enable the use of flexible bandwidth, variable length TTIs, and a modified control channel configuration as described above with reference to FIG. 1.

UE 115-g may also include a processor 805, and memory 815 (including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-g may include a single antenna 840, UE 115-g may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., medium access for eCCs in shared spectrum, etc.). Alternatively, the software/firmware code 820 may not be directly executable by the processor 805 but instead may cause a computer (e.g., when compiled and executed) to perform functions described herein. The processor 805 may include an intelligent hardware device, (e.g., a central processing unit (CPU), a microcontroller, an ASIC, etc.)

Figure 8B:
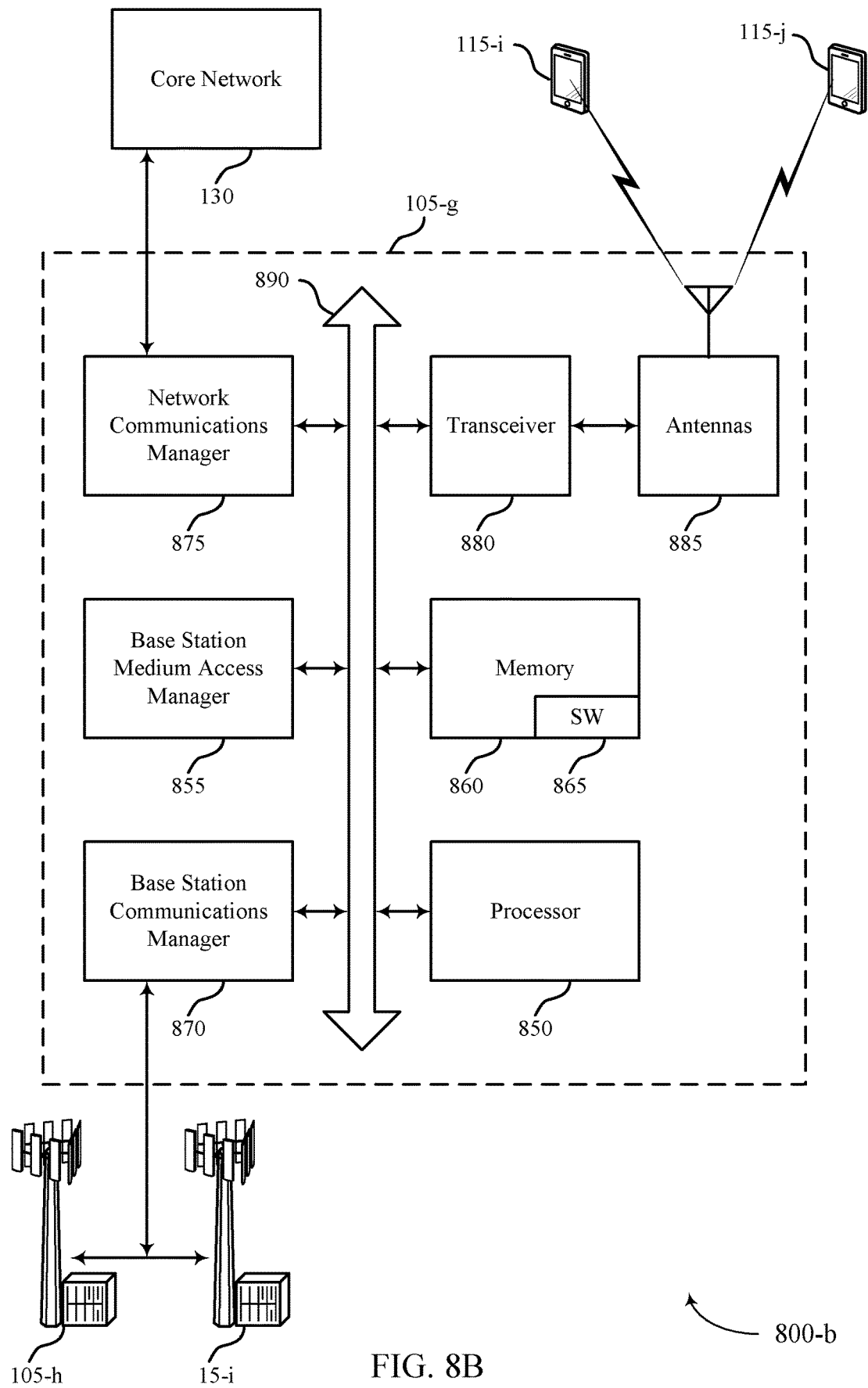
FIG. 8B illustrates a block diagram of a system including a base station configured for medium access in shared or unlicensed spectrum in accordance with various aspects of the present disclosure.

FIG. 8B illustrates a block diagram of a system 800-b including a base station configured for medium access in shared or unlicensed spectrum in accordance with various aspects of the present disclosure. System 800-a may include base station 105-g, which may be an example of a wireless device 500, a wireless device 600, or a base station 105 described above with reference to FIGS. 1-8A. Base station 105-g may include a medium access manager 855, which may be an example of a base station medium access manager 855 described with reference to FIGS. 6-8A. Base station 105-g may also include components for bi-directional voice and data communications including components for transmitting communications and components for receiving communications. For example, base station 105-g may communicate bi-directionally with base station 105-h and base station 105-i or UE 115-i and UE 115-j.

In some cases, base station 105-g may have one or more wired backhaul links. Base station 105-g may have a wired backhaul link (e.g., S1 interface, etc.) to the core network 130. Base station 105-g may also communicate with other base stations 105, such as base station 105-h and base station 105-i via inter-base station backhaul links (e.g., an X2 interface). Each of the base stations 105 may communicate with UEs 115 using the same or different wireless communications technologies. In some cases, base station 105-g may communicate with other base stations such as 105-h or 105-i utilizing base station communication manager 870. In some examples, base station communication manager 870 may provide an X2 interface within an LTE/LTE-A wireless communication network technology to provide communication between some of the base stations 105. In some examples, base station 105-g may communicate with other base stations through core network 130. Additionally or alternatively, base station 105-g may communicate with the core network 130 through network communications manager 875.

The base station 105-g may include a processor 850, memory 860 (including software (SW) 865), transceiver(s) 880, and antenna(s) 885, which each may be in communication, directly or indirectly, with one another (e.g., over bus system 890). The transceiver(s) 880 may be configured to communicate bi-directionally, via the antenna(s) 885, with the UEs 115, which may be multi-mode devices. The transceiver(s) 880 (or other components of the base station 105-g) may also be configured to communicate bi-directionally, via the antenna(s) 885, with one or more other base stations (not shown). The transceiver(s) 880 may include a modem configured to modulate the packets and provide the modulated packets to the antenna(s) 885 for transmission, and to demodulate packets received from the antenna(s) 885. The base station 105-g may include multiple transceivers 880, each with one or more associated antenna(s) 885. The transceiver(s) 880 may be an example of a combined receiver 505 and transmitter 515 of FIG. 5.

The memory 860 may include RAM and ROM. The memory 860 may also store computer-readable, computer-executable software code 865 containing instructions that are configured to, when executed, cause the processor 850 to perform various functions described herein (e.g., medium access, selecting coverage enhancement techniques, call processing, database management, message routing, etc.). Alternatively, the software 865 may not be directly executable by the processor 850 but may instead be configured to cause the computer, e.g., when compiled and executed, to perform functions described herein. The processor 850 may include an intelligent hardware device, e.g., a central processing unit (CPU), a microcontroller, an ASIC, etc. The processor 850 may include various special purpose processors such as encoders, queue processing modules, base band processors, radio head controllers, digital signal processor (DSPs), and the like.

The base station communications manager 870 may manage communications with other base stations 105. The communications management manager 870 may include a controller or scheduler for controlling communications with UEs 115 in cooperation with other base stations 105. For example, the base station communications manager 870 may coordinate scheduling for transmissions to UEs 115 for various interference mitigation techniques such as beamforming or joint transmission.

Figure 9:
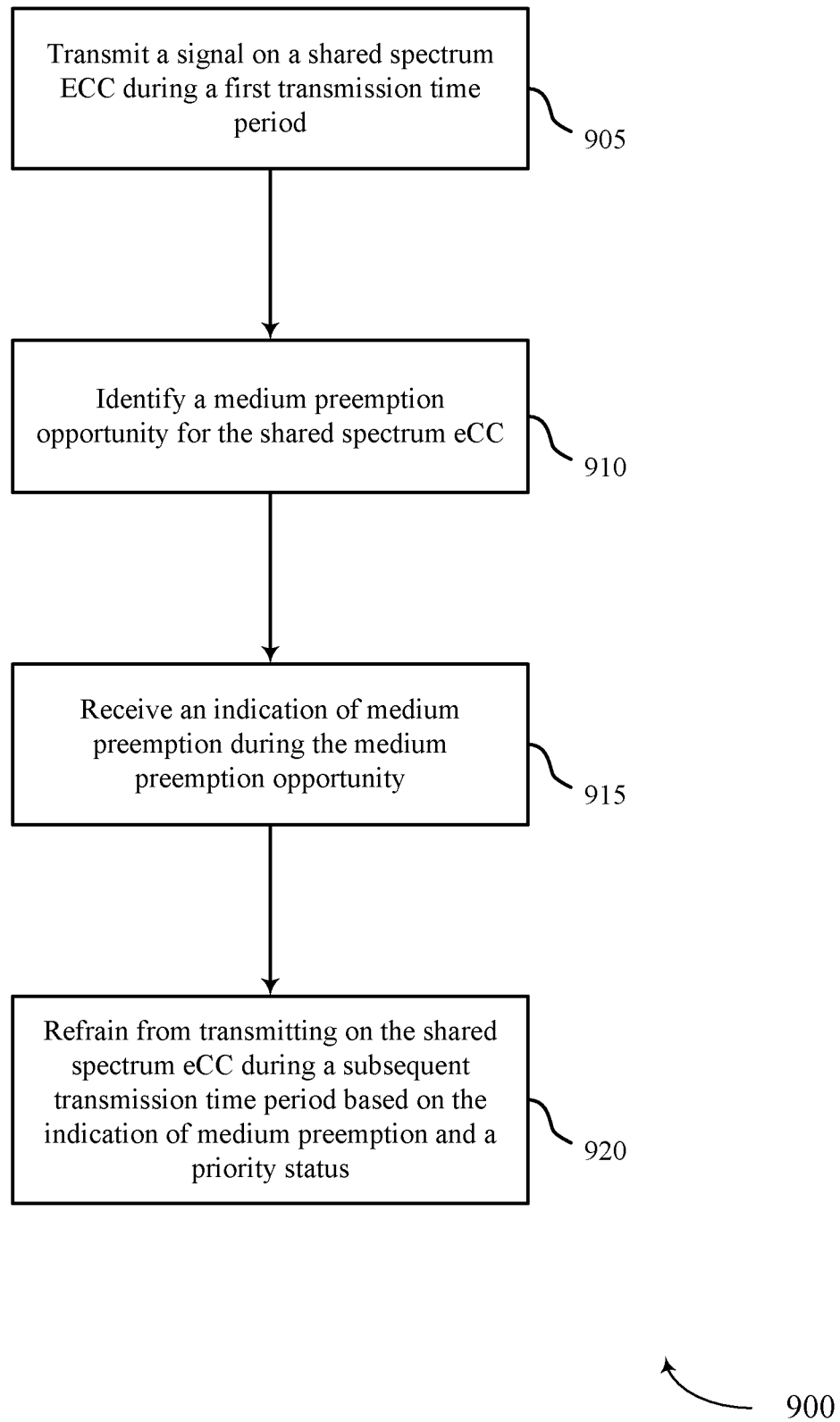
FIG. 9 shows a flowchart illustrating a method for medium access in shared or unlicensed spectrum in accordance with various aspects of the present disclosure.

FIG. 9 shows a flowchart illustrating a method 900 for medium access in shared or unlicensed spectrum in accordance with various aspects of the present disclosure. The operations of method 900 may be implemented by a device such as a UE 115 or a base station 105 or components thereof as described with reference to FIGS. 1-8B. For example, the operations of method 900 may be performed by the medium access manager 510 as described with reference to FIGS. 5-8B. In some examples, a device may execute a set of codes to control the functional elements of the device to perform the functions described below. Additionally or alternatively, the device may perform aspects the functions described below using special-purpose hardware.

At 905, the device may transmit a signal on a carrier in shared or unlicensed spectrum during a first transmission time period as described above with reference to FIGS. 2-4. In certain examples, the operations of 905 may be performed by the transmitter 515 as described above with reference to FIG. 5.

At 910, the device may identify a medium preemption opportunity for the carrier as described above with reference to FIGS. 2-4. In certain examples, the operations of 910 may be performed by the medium preemption opportunity identifier 605 as described above with reference to FIG. 6.

At 915, the device may receive an indication of medium preemption during the medium preemption opportunity as described above with reference to FIGS. 2-4. In one or more embodiments, the operations of 915 may be performed by the medium preemption processor 610 as described above with reference to FIG. 6.

At 920, the device may refrain from transmitting on the carrier during a subsequent transmission time period based at least in part on the indication of medium preemption and a priority status as described above with reference to FIGS. 2-4. In certain examples, the operations of 920 may be performed by the transmission controller 615 as described above with reference to FIG. 6.

Figure 10:
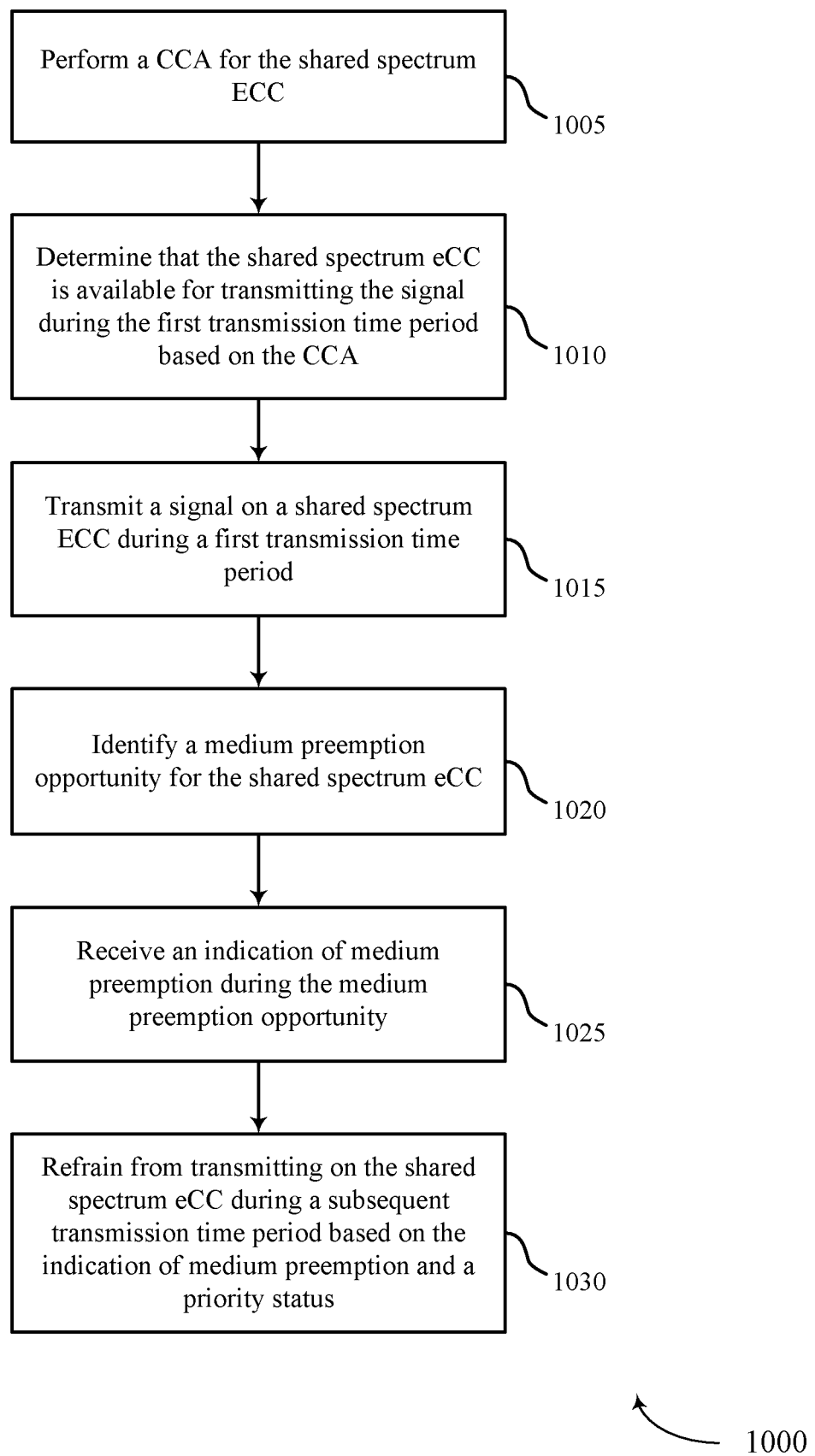
FIG. 10 shows a flowchart illustrating a method for medium access in shared or unlicensed spectrum in accordance with various aspects of the present disclosure.

FIG. 10 shows a flowchart illustrating a method 1000 for medium access in shared or unlicensed spectrum in accordance with various aspects of the present disclosure. The operations of method 1000 may be implemented by a device such as a UE 115 or a base station 105 or components thereof as described with reference to FIGS. 1-8B. For example, the operations of method 1000 may be performed by the medium access manager 510 as described with reference to FIGS. 5-8B. In some examples, a device may execute a set of codes to control the functional elements of the device to perform the functions described below. Additionally or alternatively, the device may perform aspects the functions described below using special-purpose hardware. The method 1000 may also incorporate aspects of method 900 of FIG. 9.

At 1005, the device may perform a CCA for the shared or unlicensed spectrum as described above with reference to FIGS. 2-4. In certain examples, the operations of 1005 may be performed by the CCA manager 705 as described above with reference to FIG. 7.

At 1010, the device may determine that the shared or unlicensed spectrum is available for transmitting the signal during the first transmission time period based at least in part on the CCA as described above with reference to FIGS. 2-4. In certain examples, the operations of 1010 may be performed by the CCA manager 705 as described above with reference to FIG. 7.

At 1015, the device may transmit a signal on a carrier in the shared or unlicensed spectrum during a first transmission time period as described above with reference to FIGS. 2-4. In certain examples, the operations of 1015 may be performed by the transmitter 515 as described above with reference to FIG. 5.

At 1020, the device may identify a medium preemption opportunity for the carrier as described above with reference to FIGS. 2-4. In certain examples, the operations of 1020 may be performed by the medium preemption opportunity identifier 605 as described above with reference to FIG. 6.

At 1025, the device may receive an indication of medium preemption during the medium preemption opportunity as described above with reference to FIGS. 2-4. In certain examples, the operations of 1025 may be performed by the medium preemption processor 610 as described above with reference to FIG. 6.

At 1030, the device may refrain from transmitting on the carrier during a subsequent transmission time period based at least in part on the indication of medium preemption and a priority status as described above with reference to FIGS. 2-4. In certain examples, the operations of 1030 may be performed by the transmission controller 615 as described above with reference to FIG. 6.

Figure 11:
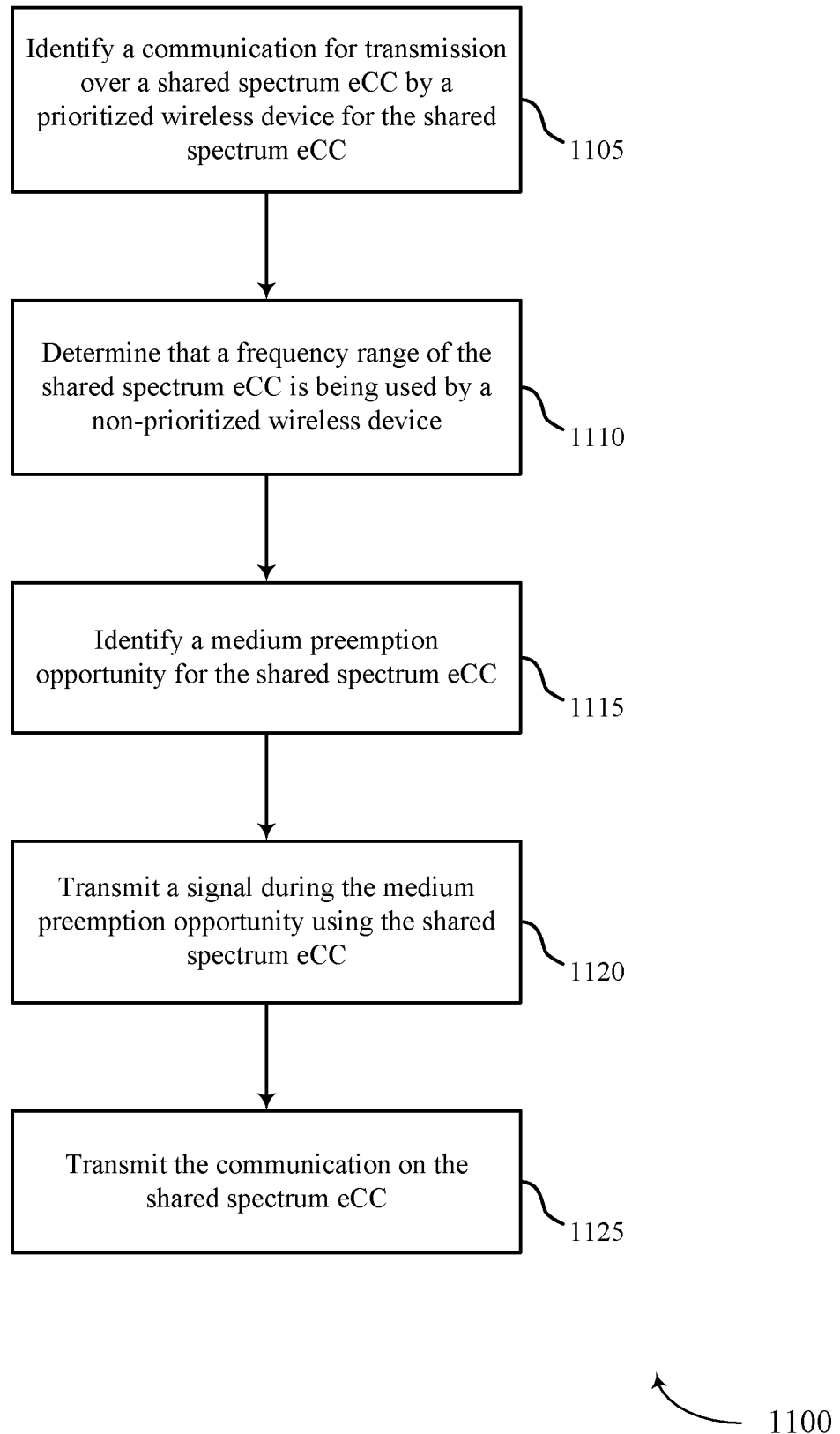
FIG. 11 shows a flowchart illustrating a method for medium access in shared or unlicensed spectrum in accordance with various aspects of the present disclosure.

FIG. 11 shows a flowchart illustrating a method 1100 for medium access in shared or unlicensed spectrum in accordance with various aspects of the present disclosure. The operations of method 1100 may be implemented by a device such as a UE 115 or a base station 105 or components thereof as described with reference to FIGS. 1-8B. For example, the operations of method 1100 may be performed by the medium access manager 510 as described with reference to FIGS. 5-8B. In some examples, a device may execute a set of codes to control the functional elements of the device to perform the functions described below. Additionally or alternatively, the device may perform aspects the functions described below using special-purpose hardware. The method 1100 may also incorporate aspects of methods 900, and 1000 of FIGS. 9-10.

At 1105, the device may identify a communication for transmission over a carrier in shared or unlicensed spectrum by a prioritized wireless device for the shared or unlicensed spectrum as described above with reference to FIGS. 2-4. In certain examples, the operations of 1105 may be performed by the communication identification manager 710 as described above with reference to FIG. 7.

At 1110, the device may determine that a frequency range of the shared or unlicensed spectrum is being used by a non-prioritized wireless device as described above with reference to FIGS. 2-4. In certain examples, the operations of 1110 may be performed by the spectrum use manager 715 as described above with reference to FIG. 7.

At 1115, the device may identify a medium preemption opportunity for the carrier as described above with reference to FIGS. 2-4. In certain examples, the operations of 1115 may be performed by the medium preemption opportunity identifier 605 as described above with reference to FIG. 6.

At 1120, the device may transmit a signal during the medium preemption opportunity using the carrier as described above with reference to FIGS. 2-4. In certain examples, the operations of 1120 may be performed by the medium preemption processor 610 as described above with reference to FIG. 6.

At 1125, the device may transmit the communication on the carrier as described above with reference to FIGS. 2-4. In certain examples, the operations of 1125 may be performed by the transmitter 515 as described above with reference to FIG. 5.

Thus, methods 900, 1000, and 1100 may provide for medium access in shared spectrum. It should be noted that methods 900, 1000, and 1100 describe possible implementation, and that the operations and the steps may be rearranged or otherwise modified such that other implementations are possible. In some examples, aspects from two or more of the methods 900, 1000, and 1100 may be combined.

The detailed description set forth above in connection with the appended drawings describes exemplary configurations and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of the foregoing. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium accessible by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, solid-state or flash storage, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of communication at a wireless device, comprising:
   performing a clear channel assessment (CCA) for a shared or unlicensed spectrum, wherein a length of the CCA is based at least in part on a priority status of the wireless device, and wherein the priority status is one of an ordered set of priority statuses and associated with a CCA counter range from a set of mutually non-overlapping CCA counter ranges, a minimum for each CCA counter range being greater than a maximum for every preceding CCA counter range;
   transmitting a signal on a carrier in the shared or unlicensed spectrum based at least in part on a result of the CCA, wherein transmitting the signal establishes control of a contiguous set of time-frequency resources of the carrier by the wireless device, the contiguous set of time-frequency resources comprising a medium preemption opportunity;
   ceasing the transmitting of the signal during a time interval of the contiguous set of time-frequency resources corresponding to the medium preemption opportunity, wherein the time interval corresponding to the medium preemption opportunity is shorter than a minimum length of the CCA, and wherein ceasing the transmitting maintains the control of the contiguous set of time-frequency resources of the carrier for the priority status of the wireless device;
   receiving, after ceasing the transmitting of the signal, an indication of medium preemption during the medium preemption opportunity; and
   refraining from continuing to transmit the signal on the carrier based at least in part on the indication of medium preemption and the priority status.

2. The method of claim 1, wherein performing the CCA comprises:
   detecting an energy profile on the shared or unlicensed spectrum or monitoring for a preamble transmitted on the shared or unlicensed spectrum.

3. The method of claim 1, wherein a frequency band comprising the shared or unlicensed spectrum is licensed to at least one prioritized network operator, and wherein the priority status is associated with a non-prioritized network operator using the frequency band.

4. A method of communication at a prioritized wireless device, comprising:
   determining whether to perform a clear channel assessment (CCA) of a shared or unlicensed spectrum based at least in part on a priority status of the prioritized wireless device, wherein the priority status is one of an ordered set of priority statuses and associated with a CCA counter range from a set of mutually non-overlapping CCA counter ranges, a minimum for each CCA counter range being greater than a maximum for every preceding CCA counter range;
   identifying a communication for transmission over a carrier in the shared or unlicensed spectrum;
   determining that the carrier is being used by a non-prioritized wireless device;
   identifying a medium preemption opportunity for the carrier based at least in part on the determination that the carrier is being used by the non-prioritized wireless device, wherein the medium preemption opportunity corresponds to a dedicated time interval within a contiguous set of time-frequency resources during which the non-prioritized wireless device ceases transmission for preemption by prioritized wireless devices while maintaining control of the contiguous set of time-frequency resources of the carrier relative to other non-prioritized wireless devices, wherein the medium preemption opportunity is shorter than a minimum length of the CCA;
   transmitting, during the medium preemption opportunity, a signal indicating preemption of the carrier by the prioritized wireless device, the signal preempting the ceased transmission of the non-prioritized wireless device to establish control of the carrier by the prioritized wireless device; and
   transmitting the communication on the carrier based at least in part on the medium preemption opportunity and the signal indicating preemption.

5. The method of claim 4, wherein transmitting the communication comprises:
   transmitting signaling associated with the communication during a communication time period that includes a next medium preemption opportunity for the carrier.

6. The method of claim 4, wherein transmitting the communication on the carrier comprises:
   beginning to transmit the communication on the carrier prior to, at the start of, or during the medium preemption opportunity.

7. An apparatus for communication at a wireless device, comprising:
   at least one processor;
   a memory coupled to the at least one processor; and
   instructions stored in the memory;
   wherein the instructions are executable by the at least one processor to:
   perform a clear channel assessment (CCA) for a shared or unlicensed spectrum, wherein a length of the CCA is based at least in part on a priority status of the wireless device, and wherein the priority status is one of an ordered set of priority statuses and associated with a CCA counter range from a set of mutually non-overlapping CCA counter ranges, a minimum for each CCA counter range being greater than a maximum for every preceding CCA counter range;

transmit a signal on a carrier in the shared or unlicensed spectrum based at least in part on a result of the CCA, wherein transmitting the signal establishes control of a contiguous set of time-frequency resources of the carrier by the wireless device, the contiguous set of time-frequency resources comprising a medium preemption opportunity;

cease to transmit the signal during a time interval of the contiguous set of time-frequency resources corresponding to the medium preemption opportunity for the carrier, wherein the time interval corresponding to the medium preemption opportunity is shorter than a minimum length of the CCA, and wherein ceasing transmission maintains the control of the contiguous set of time-frequency resources of the carrier for the priority status of the wireless device;

receive, after ceasing to transmit the signal, an indication of medium preemption during the medium preemption opportunity; and refrain from continuing to transmit the signal on the carrier based at least in part on the indication of medium preemption and the priority status.

8. The apparatus of claim 7, wherein, to perform the CCA, the instructions are executable by the at least one processor to:

detect an energy profile on the shared or unlicensed spectrum or monitor for a preamble transmitted on the shared or unlicensed spectrum.

9. The apparatus of claim 7, wherein a frequency band comprising the shared or unlicensed spectrum is licensed to at least one prioritized network operator, and wherein the priority status is associated with a non-prioritized network operator using the frequency band.

10. An apparatus for communication at a prioritized wireless device, comprising:

at least one processor;

memory coupled to the at least one processor; and instructions stored in the memory;

wherein the instructions are executable by the at least one processor to:

determine whether to perform a clear channel assessment (CCA) of a shared or unlicensed spectrum based at least in part on a priority status of the prioritized wireless device, wherein the priority status is one of an ordered set of priority statuses and associated with a CCA counter range from a set of mutually non-overlapping CCA counter ranges, a minimum for each CCA counter range being greater than a maximum for every preceding CCA counter range;

identify a communication for transmission over a carrier in the shared or unlicensed spectrum;

determine that the carrier is being used by a non-prioritized wireless device;

identify a medium preemption opportunity for the carrier based at least in part on the determination that the carrier is being used by the non-prioritized wireless device, wherein the medium preemption opportunity corresponds to a dedicated time interval within a contiguous set of time-frequency resources during which the non-prioritized wireless device ceases transmission for preemption by prioritized wireless devices while maintaining control of the contiguous set of time-frequency resources of the carrier relative to other non-prioritized wireless devices, wherein the medium preemption opportunity is shorter than a minimum length of the CCA;

transmit, during the medium preemption opportunity, a signal indicating preemption of the carrier by the prioritized wireless device, the signal preempting the ceased transmission of the non-prioritized wireless device to establish control of the carrier by the prioritized wireless device; and transmit the communication on the carrier based at least in part on the medium preemption opportunity and the signal indicating preemption.

11. The apparatus of claim 10, wherein the instructions are executable by the at least one processor to:

transmit signaling associated with the communication during a communication time period that includes a next medium preemption opportunity for the carrier.

12. The apparatus of claim 10, wherein the instructions are executable by the at least one processor to:

begin to transmit the communication on the carrier prior to, at the start of, or during the medium preemption opportunity.

* * * * *